US009093194B2

(12) United States Patent
McCullough et al.

(10) Patent No.: US 9,093,194 B2
(45) Date of Patent: Jul. 28, 2015

(54) INSULATED COMPOSITE POWER CABLE AND METHOD OF MAKING AND USING SAME

(71) Applicant: 3M INNOVATIVE PROPERTIES COMPANY, St. Paul, MN (US)

(72) Inventors: Collin McCullough, Chanhassen, MN (US); Herve E. Deve, Minneapolis, MN (US); Michael F. Grether, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/454,050

(22) Filed: Aug. 7, 2014

(65) Prior Publication Data

US 2014/0345906 A1 Nov. 27, 2014

Related U.S. Application Data

(63) Continuation of application No. 13/382,597, filed as application No. PCT/US2010/041315 on Jul. 8, 2010, now Pat. No. 8,831,389.

(60) Provisional application No. 61/226,151, filed on Jul. 16, 2009, provisional application No. 61/226,056, filed on Jul. 16, 2009.

(51) Int. Cl.
*G02B 6/44* (2006.01)
*H01B 9/00* (2006.01)
(Continued)

(52) U.S. Cl.
CPC .................. *H01B 7/14* (2013.01); *H01B 7/045* (2013.01); *H01B 9/003* (2013.01); *H01B 9/006* (2013.01);
(Continued)

(58) Field of Classification Search
CPC ........................................................ G02B 6/44
USPC .................................................. 385/101, 15
See application file for complete search history.

(56) References Cited

U.S. PATENT DOCUMENTS 1,793,293 A 2/1931 Varney
2,698,353 A 12/1954 Carr
(Continued)

FOREIGN PATENT DOCUMENTS

CN 2147625 11/1993
CN 1430785 7/2003
(Continued)

OTHER PUBLICATIONS

TransPowr™ ACCC/TW Bare Overhead Conductor, Dec. 31, 2005 (125 pages).
(Continued)

*Primary Examiner* — Kaveh Kianni
(74) *Attorney, Agent, or Firm* — Adam Bramwell; James A. Baker

(57) ABSTRACT

An insulated composite power cable having a wire core defining a common longitudinal axis, a multiplicity of composite wires around the wire core, and an insulative sheath surrounding the composite wires. In some embodiments, a first multiplicity of composite wires is helically stranded around the wire core in a first lay direction at a first lay angle defined relative to a center longitudinal axis over a first lay length, and a second multiplicity of composite wires is helically stranded around the first multiplicity of composite wires in the first lay direction at a second lay angle over a second lay length, the relative difference between the first lay angle and the second lay angle being no greater than about 4°. The insulated composite cables may be used for underground or underwater electrical power transmission. Methods of making and using the insulated composite cables are also described.

22 Claims, 6 Drawing Sheets

(51) Int. Cl.
*H01B 7/14* (2006.01)
*H01B 7/04* (2006.01)
*H01B 13/00* (2006.01)
*H01B 7/18* (2006.01)

(52) U.S. Cl.
CPC ................ *H01B 13/00* (2013.01); *H01B 7/182* (2013.01); *Y10T 29/49117* (2015.01); *Y10T 29/49201* (2015.01)

(56) References Cited

U.S. PATENT DOCUMENTS 3,429,722 A 2/1969 Economy
3,717,720 A 2/1973 Snellman
3,795,524 A 3/1974 Sowman
4,047,965 A 9/1977 Karst
4,079,192 A 3/1978 Josse
4,345,112 A 8/1982 Sugata
4,606,604 A 8/1986 Soodak
4,753,500 A * 6/1988 Guazzo ........................... 385/69
4,791,240 A 12/1988 Marin
4,813,221 A 3/1989 Christian et al.
4,816,620 A * 3/1989 Beach ........................... 174/115
4,954,462 A 9/1990 Wood
5,015,958 A * 5/1991 Masia et al. .................. 324/522
5,112,882 A 5/1992 Babu
5,171,942 A 12/1992 Powers
5,185,299 A 2/1993 Wood
5,210,377 A 5/1993 Kennedy
5,230,033 A * 7/1993 Soodak ......................... 385/105
5,268,971 A 12/1993 Nilsson
5,362,921 A 11/1994 Birkelund
5,408,562 A * 4/1995 Yoshizawa et al. ........... 385/112
5,554,826 A 9/1996 Gentry
5,725,650 A 3/1998 Flenniken
5,747,563 A 5/1998 Flenniken
5,780,154 A 7/1998 Okano
6,180,232 B1 1/2001 McCullough
6,180,721 B1 1/2001 Rogestedt
6,245,425 B1 6/2001 McCullough
6,247,359 B1 6/2001 De Angelis
6,329,056 B1 12/2001 Deve
6,336,495 B1 1/2002 McCullough
6,344,270 B1 2/2002 McCullough
6,447,927 B1 9/2002 McCullough
6,460,597 B1 10/2002 McCullough
6,485,796 B1 11/2002 Carpenter
6,544,645 B1 4/2003 McCullough
6,559,385 B1 5/2003 Johnson
6,563,054 B1 5/2003 Damien
6,692,842 B2 2/2004 McCullough
6,723,451 B1 4/2004 McCullough
6,747,213 B2 6/2004 Bonicel
6,796,365 B1 9/2004 McCullough
6,958,463 B1 * 10/2005 Kochman et al. ............. 219/544
7,093,416 B2 8/2006 Johnson
7,131,308 B2 11/2006 McCullough
7,179,522 B2 2/2007 Hiel
7,239,781 B2 7/2007 Chartier
7,409,816 B2 8/2008 Susai
7,413,474 B2 8/2008 Liu
7,417,187 B2 8/2008 Tanaka
7,462,781 B2 12/2008 Varkey
7,473,844 B2 1/2009 Figenschou
7,750,245 B2 7/2010 Debladis
7,754,966 B2 7/2010 Figenschou
7,763,802 B2 7/2010 Varkey
7,767,910 B2 8/2010 Kjellqvist
7,935,885 B2 5/2011 Elie
8,119,917 B2 2/2012 King
8,186,911 B2 5/2012 Figenschou
8,212,148 B1 * 7/2012 Lenges et al. ............. 174/110 R
8,247,036 B2 8/2012 Jiang
8,304,651 B2 11/2012 Figenschou
8,502,077 B2 8/2013 Kay
8,534,133 B2 9/2013 Hucker
8,831,389 B2 9/2014 McCullough
8,861,911 B2 10/2014 Shin
8,946,556 B2 2/2015 Sunaga
8,960,271 B2 2/2015 Lahijani
2002/0027012 A1 3/2002 Bonicel
2003/0124377 A1 * 7/2003 McCullough et al. ........ 428/611
2003/0194916 A1 10/2003 Quesnel
2004/0020681 A1 2/2004 Hjortstam
2004/0185290 A1 9/2004 McCullough
2005/0061538 A1 3/2005 Blucher
2005/0258928 A1 * 11/2005 Hase et al. ...................... 337/14
2006/0102377 A1 5/2006 Johnson
2006/0137880 A1 6/2006 Figenschou
2006/0141252 A1 6/2006 Chartier
2006/0193572 A1 8/2006 Mjelstad
2006/0231286 A1 * 10/2006 Varkey ...................... 174/113 R
2007/0000682 A1 * 1/2007 Varkey et al. ............. 174/102 R
2007/0044991 A1 * 3/2007 Varkey ...................... 174/102 R
2007/0044992 A1 3/2007 Bremnes
2007/0044993 A1 3/2007 Varkey
2007/0205009 A1 9/2007 Figenschou
2007/0237469 A1 10/2007 Espen
2007/0253778 A1 11/2007 Figenschou
2007/0271897 A1 11/2007 Hanna
2008/0081721 A1 4/2008 Bissig
2009/0120663 A1 5/2009 Karlsen
2009/0194314 A1 8/2009 Varkey
2010/0038112 A1 2/2010 Grether
2010/0054677 A1 3/2010 Figenschou et al.
2010/0293783 A1 11/2010 Goldsworthy et al.
2011/0005795 A1 1/2011 Deighton
2011/0074380 A1 * 3/2011 Jeon ............................. 323/318
2011/0174519 A1 7/2011 Shah
2012/0024565 A1 * 2/2012 Orini ......................... 174/106 R
2012/0111603 A1 5/2012 Cofre
2014/0245604 A1 9/2014 Hashizawa
2014/0321822 A1 10/2014 Yasuda

FOREIGN PATENT DOCUMENTS

| | | | |
|---|---|---|---|
| CN | 1446267 | | 10/2003 |
| CN | 2906842 | | 5/2007 |
| CN | 201904106 | U | 7/2011 |
| CN | 202384080 | | 8/2012 |
| CN | 202473374 | | 10/2012 |
| CN | 202584899 | | 12/2012 |
| CN | 202871383 | | 4/2013 |
| CN | 202887855 | | 4/2013 |
| CN | 203102989 | | 7/2013 |
| CN | 203150284 | | 8/2013 |
| CN | 203150285 | | 8/2013 |
| CN | 203397754 | | 1/2014 |
| CN | 203406089 | | 1/2014 |
| CN | 103646716 | | 3/2014 |
| CN | 103794288 | | 5/2014 |
| CN | 103871647 | | 6/2014 |
| CN | 103903796 | | 7/2014 |
| CN | 203689976 | | 7/2014 |
| CN | 203787193 | U | 8/2014 |
| CN | 104157359 | | 11/2014 |
| CN | 204010804 | | 12/2014 |
| DE | 60226060 | | 5/2009 |
| EA | 007945 | | 2/2007 |
| GB | 750703 | | 6/1956 |
| GB | 1346986 | | 2/1974 |
| GB | 2240997 | | 8/1991 |
| JP | 01150483 | | 6/1989 |
| JP | 4-32109 | | 2/1992 |
| JP | 11-66978 | | 3/1999 |
| JP | 2001-210153 | | 8/2001 |
| JP | 2004311208 | | 11/2004 |
| JP | 2007-521968 | | 8/2007 |
| JP | 2008-503051 | | 1/2008 |
| JP | 2008-504469 | | 2/2008 |
| KR | 2001658060000 | | 2/2000 |
| KR | 1003002010000 | | 10/2001 |
| KR | 1008429850000 | | 1/2008 |
| RU | 2063080 | | 6/1996 |

(56) References Cited

FOREIGN PATENT DOCUMENTS

| | | | |
|---|---|---|---|
| WO | WO 02/06550 | | 1/2002 |
| WO | WO 2005/082556 | | 9/2005 |
| WO | WO 2005/124095 | | 12/2005 |
| WO | WO 2005/124213 | | 12/2005 |
| WO | WO 2006-006996 | | 1/2006 |
| WO | WO 2006/006997 | * | 1/2006 |
| WO | WO 2007139369 | | 12/2007 |
| WO | WO 2008-100632 | | 8/2008 |
| WO | WO 2008/129116 | | 10/2008 |
| WO | WO 2011/008568 | | 1/2011 |
| WO | WO 2011/008620 | | 1/2011 |
| WO | WO 2011/094146 | | 8/2011 |
| WO | WO 2011/103036 | | 8/2011 |

OTHER PUBLICATIONS

Eastern Africa Submarine Cable System (EASSy) OALC-4 Submarine Cable Technical Description, Dec. 31, 2008 (41 pages).
Gorur, "Mechanical and Electrical Issues Concerning the Use of Composite Materials for the Supporting Core and Transmission Line Conductors" Oct. 31, 2006 (4 pages).
Wikipedia, "wire rope"; Sep. 1, 2009 (5 pgs).
TransPowr™ ACCO/TW Bare Overhead Conductor, Dec. 31, 2005 (125 pages).

* cited by examiner

INSULATED COMPOSITE POWER CABLE AND METHOD OF MAKING AND USING SAME

CROSS REFERENCE TO RELATED APPLICATION

This application is a continuation of U.S. Ser. No. 13/382,597, filed Jan. 6, 2012, now allowed, which is a U.S. 371 National Stage Application of PCT/US2010/041315, filed Jul. 8, 2010, which claims the benefit of U.S. Provisional Application No. 61/226,151, filed Jul. 16, 2009 and also claims the benefit of U.S. Provisional Application No. 61/226,056, filed Jul. 16, 2009, the disclosure of which are incorporated by reference in their entirety.

TECHNICAL FIELD

The present disclosure relates generally to insulated composite power cables and their method of manufacture and use. The disclosure further relates to insulated stranded power cables, including helically stranded composite wires, and their method of manufacture and use as underground or underwater power transmission cables.

BACKGROUND

There have been recently introduced useful cable articles from materials that are composite and thus cannot readily be plastically deformed to a new shape. Common examples of these materials include fiber reinforced composites which are attractive due to their improved mechanical properties relative to metals but are primarily elastic in their stress strain response. Composite cables containing fiber reinforced polymer wires are known in the art, as are composite cables containing ceramic fiber reinforced metal wires, see, e.g., U.S. Pat. Nos. 6,559,385 and 7,093,416; and Published PCT Application WO 97/00976.

One use of composite cables (e.g., cables containing polymer matrix composite or metal matrix composite wires) is as a reinforcing member in bare (i.e. non-insulated) cables used for above-ground electrical power transmission. Although bare electrical power transmission cables including aluminum matrix composite wires are known, for some applications there is a continuing desire to obtain improved cable properties. For example, bare electrical power transmission cables are generally believed to be unsuitable for use in underground or underwater electrical power transmission applications.

In addition, in some applications, it may be desirable to use stranded composite cables for electrical power transmission. Cable stranding is a process in which individual ductile wires are combined, typically in a helical arrangement, to produce a finished cable. See, e.g., U.S. Pat. Nos. 5,171,942 and 5,554,826. Helically stranded power transmission cables are typically produced from ductile metals such as steel, aluminum, or copper. In some cases, such as bare overhead electrical power transmission cables, a helically stranded wire core is surrounded by a wire conductor layer. The helically stranded wire core could comprise ductile metal wires made from a first material such as steel, for example, and the outer power conducting layer could comprise ductile metal wires made from another material such as aluminum, for example. In some cases, the helically stranded wire core may be a pre-stranded cable used as an input material to the manufacture of a larger diameter electrical power transmission cable.

Helically stranded cables generally may comprise as few as seven individual wires to more common constructions containing 50 or more wires.

The art continually searches for improved composite cables for use in underground or underwater (i.e., submersible) electrical power transmission applications. The art also searches for improved stranded composite power transmission cables, and for improved methods of making and using stranded composite cables.

SUMMARY

In some applications, it is desirable to further improve the construction of composite cables and their method of manufacture. In certain applications, it is desirable to improve the resistance to electrical short-circuiting, the moisture resistance, and/or the chemical resistance of composite electrical power transmission cables. In some applications, it may be desirable to provide an insulative sheath surrounding the composite electrical power transmission cable, rendering the cable suitable for use in underground or underwater electrical power transmission applications.

In other applications, it is desirable to improve the physical properties of stranded composite cables, for example, their tensile strength and elongation to failure of the cable. In some particular applications, it is further desirable to provide a convenient means to maintain the helical arrangement of helically stranded composite wires prior to incorporating them into a subsequent article such as an electrical power transmission cable. Such a means for maintaining the helical arrangement has not been necessary in prior cores with plastically deformable ductile metal wires, or with wires that can be cured or set after being arranged helically.

Certain embodiments of the present disclosure are directed at providing an insulative sheath surrounding the electrical power transmission cable. Other embodiments of the present disclosure are directed at stranded composite cables and methods of helically stranding composite wire layers in a common lay direction that result in a surprising increase in tensile strength of the composite cable when compared to composite cables helically stranded using alternate lay directions between each composite wire layer. Such a surprising increase in tensile strength has not been observed for conventional ductile (e.g., metal, or other non-composite) wires when stranded using a common lay direction. Furthermore, there is typically a low motivation to use a common lay direction for the stranded wire layers of a conventional ductile wire cable, because the ductile wires may be readily plastically deformed, and such cables generally use shorter lay lengths, for which alternating lay directions may be preferred for maintaining cable integrity.

Thus, in one aspect, the present disclosure provides an insulated composite power cable, comprising a wire core defining a common longitudinal axis, a plurality of composite wires around the wire core, and an insulative sheath surrounding the plurality of composite wires. In some exemplary embodiments, at least a portion of the plurality of composite wires is arranged around the single wire defining the common longitudinal axis in at least one cylindrical layer formed about the common longitudinal axis when viewed in a radial cross section. In other exemplary embodiments, the wire core comprises at least one of a metal conductor wire or a composite wire. In certain exemplary embodiments, the wire core comprises at least one optical fiber.

In further exemplary embodiments, the plurality of composite wires around the wire core is arranged in at least two cylindrical layers defined about the common longitudinal axis when viewed in a radial cross section. In additional exemplary embodiments, at least one of the at least two cylindrical layers comprises only the composite wires. In certain additional exemplary embodiments, at least one of the at least two cylindrical layers further comprises at least one ductile metal wire.

In additional exemplary embodiments, at least a portion of the plurality of composite wires is stranded around the wire core about the common longitudinal axis. In some additional exemplary embodiments, the at least a portion of the plurality of composite wires is helically stranded. In other additional exemplary embodiments, each cylindrical layer is stranded at a lay angle in a lay direction that is the same as a lay direction for each adjoining cylindrical layer. In certain presently preferred embodiments, a relative difference between lay angles for each adjoining cylindrical layer is no greater than about 4°. In other exemplary embodiments, the composite wires have a cross-sectional shape selected from the group consisting of circular, elliptical, oval, rectangular, and trapezoidal.

In other exemplary embodiments, each of the composite wires is a fiber reinforced composite wire. In some exemplary embodiments, at least one of the fiber reinforced composite wires is reinforced with one of a fiber tow or a monofilament fiber. In certain exemplary embodiments, each of the composite wires is selected from the group consisting of a metal matrix composite wire and a polymer composite wire. In some exemplary embodiments, the polymer composite wire comprises at least one continuous fiber in a polymer matrix. In further exemplary embodiments, the at least one continuous fiber comprises metal, carbon, ceramic, glass, or combinations thereof.

In additional exemplary embodiments, at least one continuous fiber comprises titanium, tungsten, boron, shape memory alloy, carbon, carbon nanotubes, graphite, silicon carbide, aramid, poly(p-phenylene-2,6-benzobisoxazole, or combinations thereof. In some exemplary embodiments, the polymer matrix comprises a (co)polymer selected from the group consisting of an epoxy, an ester, a vinyl ester, a polyimide, a polyester, a cyanate ester, a phenolic resin, a bismaleimide resin, polyetheretherketone, a fluoropolymer (including fully and partially fluorinated (co)polymers), and combinations thereof.

In other exemplary embodiments, the metal matrix composite wire comprises at least one continuous fiber in a metal matrix. In some exemplary embodiments, the metal matrix comprises aluminum, zinc, tin, magnesium, alloys thereof, or combinations thereof. In certain embodiments, the metal matrix comprises aluminum, and the at least one continuous fiber comprises a ceramic fiber. In some exemplary embodiments, the at least one continuous fiber comprises a material selected from the group consisting of ceramics, glasses, carbon nanotubes, carbon, silicon carbide, boron, iron, steel, ferrous alloys, tungsten, titanium, shape memory alloy, and combinations thereof.

In certain presently preferred embodiments, the metal matrix comprises aluminum, and the at least one continuous fiber comprises a ceramic fiber. Suitable ceramic fibers are available under the tradename NEXTEL ceramic fibers (available from 3M Company, St. Paul, Minn.), and include, for example, NEXTEL 312 ceramic fibers. In certain presently preferred embodiments, the ceramic fiber comprises polycrystalline $\alpha$-$Al_2O_3$.

In additional exemplary embodiments, the insulative sheath forms an outer surface of the insulated composite power cable. In some exemplary embodiments, the insulative sheath comprises a material selected from the group consisting of a ceramic, a glass, a (co)polymer, and combinations thereof.

In another aspect, the present disclosure provides a method of making an insulated composite power cable, comprising (a) providing a wire core defining a common longitudinal axis, (b) arranging a plurality of composite wires around the wire core, and (c) surrounding the plurality of composite wires with an insulative sheath. In some exemplary embodiments, at least a portion of the plurality of composite wires is arranged around the single wire defining the common longitudinal axis in at least one cylindrical layer formed about the common longitudinal axis when viewed in a radial cross section. In certain exemplary embodiments, at least a portion of the plurality of composite wires is helically stranded around the wire core about the common longitudinal axis. In certain presently preferred embodiments, each cylindrical layer is stranded at a lay angle in a lay direction opposite to that of each adjoining cylindrical layer. In additional presently preferred embodiments, a relative difference between lay angles for each adjoining cylindrical layer is no greater than about 4°.

In a further aspect, the present disclosure provides a method of using an insulated composite power cable as described above, comprising burying at least a portion of the insulated composite power cable as described above under ground.

Exemplary embodiments of insulated composite power cables according to the present disclosure have various features and characteristics that enable their use and provide advantages in a variety of applications. For example, in some exemplary embodiments, insulated composite power cables according to the present disclosure may exhibit a reduced tendency to undergo premature fracture or failure at lower values of cable tensile strain during manufacture or use, when compared to other composite cables. In addition, insulated composite power cables according to some exemplary embodiments may exhibit improved corrosion resistance, environmental endurance (e.g., UV and moisture resistance), resistance to loss of strength at elevated temperatures, creep resistance, as well as relatively high elastic modulus, low density, low coefficient of thermal expansion, high electrical conductivity, high sag resistance, and high strength, when compared to conventional stranded ductile metal wire cables.

Thus in some exemplary embodiments, insulated stranded composite power cables made according to embodiments of the present disclosure may exhibit an increase in tensile strength of 10% or greater compared to prior art composite cables. Insulated stranded composite power cables according to certain embodiments of the present disclosure may also be made at a lower manufacturing cost due to an increase in yield from the stranding process of cable meeting the minimum tensile strength requirements for use in certain critical applications, for example, use in overhead electrical power transmission applications.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF DRAWINGS

Exemplary embodiments of the present disclosure are further described with reference to the appended figures, wherein.

Like reference numerals in the drawings indicate like elements. The drawings herein as not to scale, and in the drawings, the components of the composite cables are sized to emphasize selected features.

DETAILED DESCRIPTION

Figure 1A:
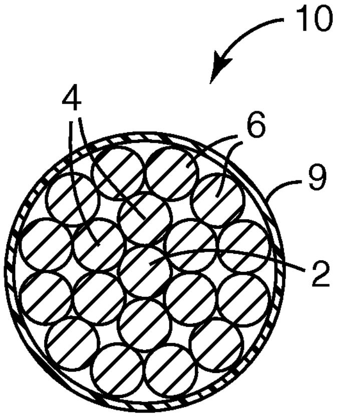
FIGS. 1A-1G are cross-sectional end views of exemplary insulated composite power cables according to exemplary embodiments of the present disclosure.

Certain terms are used throughout the description and the claims that, while for the most part are well known, may require some explanation. It should understood that, as used herein, when referring to a "wire" as being "brittle," this means that the wire will fracture under tensile loading with minimal plastic deformation.

The term "wire" is used generically to include ductile metal wires, metal matrix composite wires, polymer matrix composite wires, optical fiber wires, and hollow tubular wires for fluid transport.

The term "ductile" when used to refer to the deformation of a wire, means that the wire would substantially undergo plastic deformation during bending without fracture or breakage.

The term "composite wire" refers to a filament formed from a combination of materials differing in composition or form which are bound together, and which exhibit brittle or non-ductile behavior.

The term "metal matrix composite wire" refers to a composite wire comprising one or more fibrous reinforcing materials bound into a matrix consisting of one or more ductile metal phases.

The term "polymer matrix composite wire" similarly refers to a composite wire comprising one or more fibrous reinforcing materials bound into a matrix consisting of one or more polymeric phases.

The term "optical fiber wire" refers to a filament including at least one longitudinally light transmissive fiber element used in fiber optic communications.

The term "hollow tubular wire" refers to a longitudinally hollow conduit or tube useful for fluid transmission.

The term "bend" or "bending" when used to refer to the deformation of a wire includes two dimensional and/or three dimensional bend deformation, such as bending the wire helically during stranding. When referring to a wire as having bend deformation, this does not exclude the possibility that the wire also has deformation resulting from tensile and/or torsional forces.

"Significant elastic bend" deformation means bend deformation which occurs when the wire is bent to a radius of curvature up to 10,000 times the radius of the wire. As applied to a circular cross section wire, this significant elastic bend deformation would impart a strain at the outer fiber of the wire of at least 0.01%.

The terms "cabling" and "stranding" are used interchangeably, as are "cabled" and "stranded".

The term "lay" describes the manner in which the wires in a stranded layer of a helically stranded cable are wound into a helix.

The term "lay direction" refers to the stranding direction of the wire strands in a helically stranded layer. To determine the lay direction of a helically stranded layer, a viewer looks at the surface of the helically stranded wire layer as the cable points away from the viewer. If the wire strands appear to turn in a clockwise direction as the strands progress away from the viewer, then the cable is referred to as having a "right hand lay." If the wire strands appear to turn in a counter-clockwise direction as the strands progress away from the viewer, then the cable is referred to as having a "left hand lay".

The terms "center axis" and "center longitudinal axis" are used interchangeably to denote a common longitudinal axis positioned radially at the center of a multilayer helically stranded cable.

The term "lay angle" refers to the angle, formed by a stranded wire, relative to the center longitudinal axis of a helically stranded cable.

The term "crossing angle" means the relative (absolute) difference between the lay angles of adjacent wire layers of a helically stranded wire cable.

The term "lay length" refers to the length of the stranded cable in which a single wire in a helically stranded layer completes one full helical revolution about the center longitudinal axis of a helically stranded cable.

The term "ceramic" means glass, crystalline ceramic, glass-ceramic, and combinations thereof.

The term "polycrystalline" means a material having predominantly a plurality of crystalline grains in which the grain size is less than the diameter of the fiber in which the grains are present.

The term "continuous fiber" means a fiber having a length that is relatively infinite when compared to the average fiber diameter. Typically, this means that the fiber has an aspect ratio (i.e., ratio of the length of the fiber to the average diameter of the fiber) of at least $1\times10^5$ (in some embodiments, at least $1\times10^6$, or even at least $1\times10^7$). Typically, such fibers have a length on the order of at least about 15 cm to at least several meters, and may even have lengths on the order of kilometers or more.

The present disclosure provides, in some exemplary embodiments, an insulated composite cable suitable for use as underwater or underground electrical power transmission cables. In certain embodiments, the insulated composite cable comprises a plurality of stranded composite wires. Composite wires are generally brittle and non-ductile, and thus may not be sufficiently deformed during conventional cable stranding processes in such a way as to maintain their helical arrangement without breaking the wires. Therefore, the present disclosure provides, in certain embodiments, a higher tensile strength stranded composite cable, and further, provides, in some embodiments, a means for maintaining the helical arrangement of the wires in the stranded cable. In this way, the stranded cable may be conveniently provided as an intermediate article or as a final article. When used as an intermediate article, the stranded composite cable may be later incorporated into a final article such as an insulated composite electrical power transmission cable, for example, an underwater or underground electrical power transmission cable.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

In one aspect, the present disclosure provides an insulated composite power cable, comprising a wire core defining a common longitudinal axis, a plurality of composite wires around the wire core, and an insulative sheath surrounding the plurality of composite wires. In some exemplary embodiments, at least a portion of the plurality of composite wires is arranged around the single wire defining the common longitudinal axis in at least one cylindrical layer formed about the common longitudinal axis when viewed in a radial cross section. In other exemplary embodiments, the wire core comprises at least one of a metal conductor wire or a composite wire. In additional exemplary embodiments, at least one of the at least two cylindrical layers comprises only the composite wires. In certain additional exemplary embodiments, at least one of the at least two cylindrical layers further comprises at least one ductile metal wire.

FIGS. 1A-1G illustrate cross-sectional end views of exemplary composite cables (e.g., 10, 11, 10', and 11', respectively), which may optionally be stranded or more preferably helically stranded cables, and which may be used in forming a submersible or underground insulated composite cable according to some non-limiting exemplary embodiments of the present disclosure. As illustrated by the exemplary embodiments shown in FIGS. 1A and 1C, the insulated composite cable (10, 10') may include a single composite wire 2 defining a center longitudinal axis; a first layer comprising a first plurality of composite wires 4 (which optionally may be stranded, more preferably helically stranded around the single composite wire 2 in a first lay direction); a second layer comprising a second plurality of composite wires 6 (which optionally may be stranded, more preferably helically stranded around the first plurality of composite wires 4 in the first lay direction); and an insulative sheath 9 surrounding the plurality of composite wires.

Figure 1B:
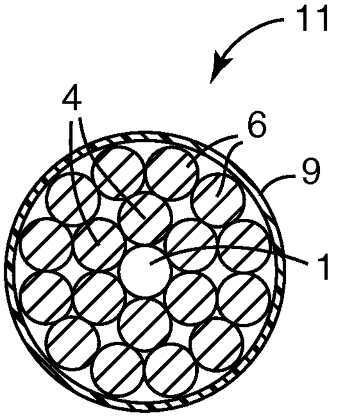
Figure 1C:
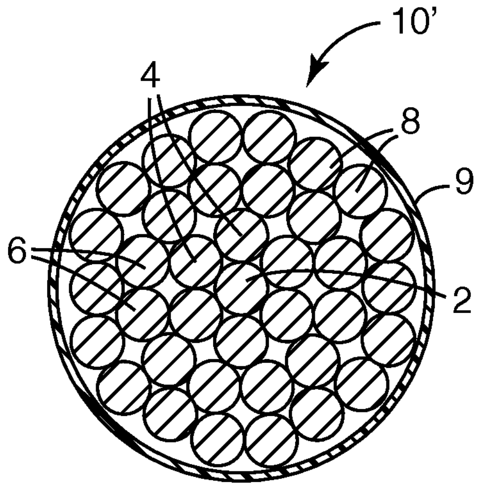

Optionally, as shown in FIG. 1C, a third layer comprising a third plurality of composite wires 8 (which optionally may be stranded, more preferably helically stranded around the second plurality of composite wires 6 in the first lay direction), may be included before applying insulative sheath 9 to form insulated composite cable 10'. Optionally, a fourth layer (not shown) or even more additional layers of composite wires (which optionally may be stranded, more preferably helically stranded) may be included around the second plurality of composite wires 6 in the first lay direction to form a composite cable.

Figure 1D:
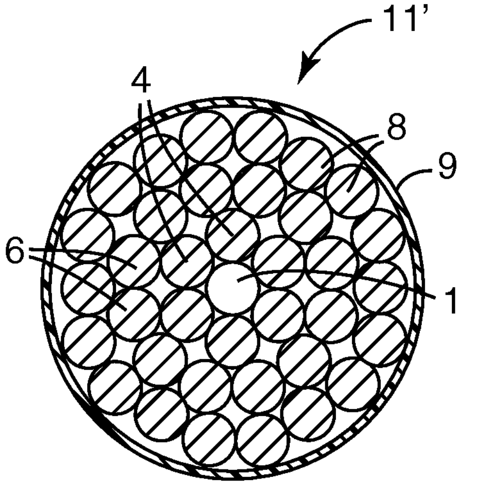

In other exemplary embodiments shown in FIGS. 1B and 1D, the composite cable (11, 11') may include a single ductile metal wire 1 (which may be, for example, a ductile metal wire) defining a center longitudinal axis; a first layer comprising a first plurality of composite wires 4 (which optionally may be stranded, more preferably helically stranded around the single ductile metal wire 1 in a first lay direction); a second layer comprising a second plurality of composite wires 6 (which optionally may be stranded, more preferably helically stranded around the first plurality of composite wires 4 in the first lay direction); and an insulative sheath 9 surrounding the plurality of composite wires.

Optionally, as shown in FIG. 1D, a third layer comprising a third plurality of composite wires 8 may be stranded around the second plurality of composite wires 6 in the first lay direction to form composite cable 11'. Optionally, a fourth layer (not shown) or even more additional layers of composite wires (which optionally may be stranded, more preferably helically stranded) may be included around the second plurality of composite wires 6 in the first lay direction to form a composite cable.

Figure 1E:
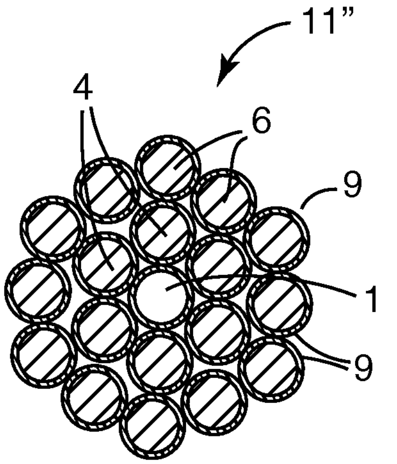
Figure 1F:
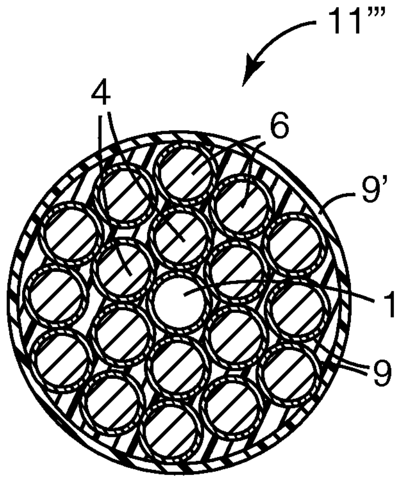

In further exemplary embodiments illustrated by FIGS. 1E-1F, one or more of the individual composite wires may be individually surrounded by an insulative sheath. Thus, as shown in FIG. 1E, the composite cable 11' includes a single core wire 1 (which may be, for example, a ductile metal wire, a metal matrix composite wire, a polymer matrix composite wire, an optical fiber wire, or a hollow tubular wire for fluid transport) defining a center longitudinal axis; a first layer comprising a first plurality of composite wires 4 (which optionally may be stranded, more preferably helically stranded around the single core wire 1 in a first lay direction); a second layer comprising a second plurality of composite wires 6 (which optionally may be stranded, more preferably helically stranded around the first plurality of composite wires 4 in the first lay direction); and an insulative sheath 9 surrounding the plurality of composite wires, wherein each individual composite wire (4, 6) is individually surrounded by the insulative sheath 9, and optionally wherein the single core wire 1 is also individually surrounded by the insulative sheath 9.

Alternatively, one or more of the individual composite wires may be individually surrounded by an insulative sheath and an optional additional sheath surrounding the entirety of the composite wires. Thus, as shown in FIG. 1F, the composite cable 11' includes a single core wire 1 (which may be, for example, a ductile metal wire, a metal matrix composite wire, a polymer matrix composite wire, an optical fiber wire, or a hollow tubular wire for fluid transport) defining a center longitudinal axis; a first layer comprising a first plurality of composite wires 4 (which optionally may be stranded, more preferably helically stranded around the single core wire 1 in a first lay direction); a second layer comprising a second plurality of composite wires 6 (which optionally may be stranded, more preferably helically stranded around the first plurality of composite wires 4 in the first lay direction); an insulative sheath 9' surrounding the entirety of the plurality of composite wires, and an additional insulative sheath 9 surrounding each individual composite wire (4, 6), and optionally, the single core wire 1. Additionally, FIG. 1F illustrates use of an optional insulative filler (labeled as 3 in FIG. 1G and discussed in further detail below with respect to FIG. 1G) to substantially fill any voids left between the individual wires (1, 4, and 6) and the insulative sheath 9' surrounding the entirety of the plurality of wires (1, 4, 6).

Figure 1G:
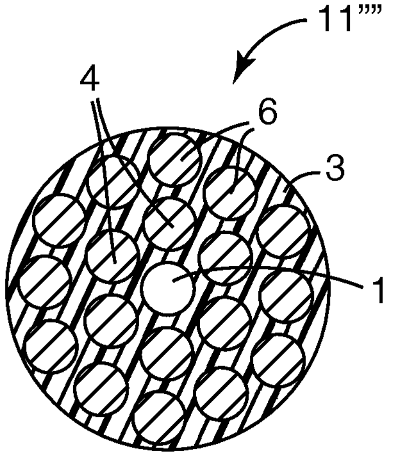

In an additional exemplary embodiment illustrated by FIG. 1G, the composite cable (11'''') may include a single core wire 1 (which may be, for example, a ductile metal wire) defining a center longitudinal axis; a first layer comprising a first plurality of composite wires 4 (which optionally may be stranded, more preferably helically stranded around the single ductile metal wire 1 in a first lay direction); a second layer comprising a second plurality of composite wires 6 (which optionally may be stranded, more preferably helically stranded around the first plurality of composite wires 4 in the first lay direction); and an insulative encapsulating sheath comprising an insulative filler 3 (which may be a binder 24 as described below with respect to FIG. 3D, or which may be an insulative material, such as a non-electrically conductive solid or liquid) surrounding the plurality of composite wires and to substantially fill any voids left between the individual wires (1, 4, and 6).

Particularly suitable solid fillers 3 include organic and inorganic powders, more particularly ceramic powders (e.g. silica, aluminum oxide, and the like), glass beads, glass bubbles, (co)polymeric (e.g. fluoropolymer) powders, fibers or films; and the like. Particularly suitable liquid fillers 3 include dielectric liquids exhibiting low electrical conductivity and having a dielectric constant of about 20 or less, more preferably oils (e.g. silicone oils, perfluoruinated fluids, and the like) useful as low dielectric fluids, and the like.

As noted above, in exemplary embodiments, the insulated composite cables comprise a plurality of composite wires. In further exemplary embodiments, at least a portion of the plurality of composite wires is stranded around the wire core about the common longitudinal axis. Suitable stranding methods, configurations and materials are disclosed in U.S. Pat. App. Pub. No. 2010/0038112 (Grether).

Thus in some exemplary embodiments, the stranded composite cables (e.g., 10, 11 in FIGS. 1A and 1B, respectively) comprise a single composite wire 2 or core wire 1 defining a center longitudinal axis; a first plurality of composite wires 4 stranded around the single composite wire 2 in a first lay direction at a first lay angle defined relative to the center longitudinal axis and having a first lay length; and a second plurality of composite wires 6 stranded around the first plurality of composite wires 4 in the first lay direction at a second lay angle defined relative to the center longitudinal axis and having a second lay length.

In additional exemplary embodiments, the stranded composite cables (e.g., 10' and 11' in FIGS. 1C and 1D, respectively) optionally further comprises a third plurality of composite wires 8 stranded around the second plurality of composite wires 6 in the first lay direction at a third lay angle defined relative to the center longitudinal axis and having a third lay length, the relative difference between the second lay angle and the third lay angle being no greater than about 4°.

In further exemplary embodiments (not shown), the stranded cable may further comprise additional (e.g., subsequent) layers (e.g., a fourth, fifth, or other subsequent layer) of composite wires stranded around the third plurality of composite wires 8 in the first lay direction at a lay angle defined relative to the common longitudinal axis, wherein the composite wires in each layer have a characteristic lay length, the relative difference between the third lay angle and the fourth or subsequent lay angle being no greater than about 4°. Embodiments in which four or more layers of stranded composite wires are employed preferably make use of composite wires having a diameter of 0.5 mm or less.

In some exemplary embodiments, the relative (absolute) difference between the first lay angle and the second lay angle is greater than 0° and no greater than about 4°. In certain exemplary embodiments, the relative (absolute) difference between one or more of the first lay angle and the second lay angle, the second lay angle and the third lay angle, is no greater than 4°, no greater than 3°, no greater than 2°, no greater than 1°, or no greater than 0.5°. In certain exemplary embodiments, one or more of the first lay angle equals the second lay angle, the second lay angle equals the third lay angle, and/or each succeeding lay angle equals the immediately preceding lay angle.

In further embodiments, one or more of the first lay length is less than or equal to the second lay length, the second lay length is less than or equal to the third lay length, the fourth lay length is less than or equal to an immediately subsequent lay length, and/or each succeeding lay length is less than or equal to the immediately preceding lay length. In other embodiments, one or more of the first lay length equals the second lay length, the second lay length equals the third lay length, and/or each succeeding lay length equals the immediately preceding lay length. In some embodiments, it may be preferred to use a parallel lay, as is known in the art.

In additional exemplary embodiments, the insulated composite cables may further comprise at least one, and in some embodiments a plurality, of non-composite wires. In some particular exemplary embodiments, the stranded cable, whether entirely composite, partially composite or entirely non-composite, may be helically stranded. In other additional exemplary embodiments, each cylindrical layer is stranded at a lay angle in a lay direction that is the same as a lay direction for each adjoining cylindrical layer. In certain presently preferred embodiments, a relative difference between lay angles for each adjoining cylindrical layer is no greater than about 4°. In other exemplary embodiments, the composite wires and/or non-composite wires have a cross-sectional shape selected from circular, elliptical, and trapezoidal.

In certain additional exemplary embodiments, the insulated composite cables may further comprise a plurality of ductile metal wires. FIGS. 2A-2E illustrate exemplary embodiments of stranded composite cables (e.g., 10' and 10") in which one or more additional layers of ductile wires (e.g., 28, 28', 28"), for example, ductile metal conductor wires, are stranded, more preferably helically stranded, around the exemplary composite cable core shown in FIG. 1A. It will be understood, however, that the disclosure is not limited to these exemplary embodiments, and that other embodiments, using other composite cable cores are within the scope of this disclosure.

Figure 2A:
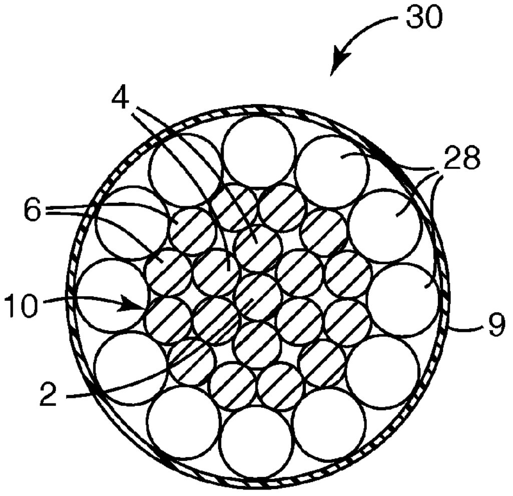
FIGS. 2A-2E are cross-sectional end views of exemplary insulated composite power cables incorporating ductile metal conductors according to other exemplary insulated composite power cables according to exemplary embodiments of the present disclosure.

Thus, in the particular embodiment illustrated by FIG. 2A, the insulated stranded composite cable 30 comprises a first plurality of ductile wires 28 stranded around a stranded non-insulated composite cable core 10 corresponding to FIG. 1A; and an insulative sheath 9 surrounding the plurality of composite and ductile wires. In an additional embodiment illustrated by FIG. 2B, the insulated stranded composite cable 40 comprises a second plurality of ductile wires 28' stranded around the first plurality of ductile wires 28 of stranded non-insulated composite cable 10 corresponding to FIG. 1A; and an insulative sheath 9 surrounding the plurality of composite and ductile wires. In a further embodiment illustrated by FIG. 2C, the insulated stranded composite cable 50 comprises a third plurality of ductile wires 28" stranded around the second plurality of ductile wires 28' of stranded non-insulated composite cable 10 corresponding to FIG. 1A; and an insulative sheath 9 surrounding the plurality of composite and ductile wires.

Figure 2B:
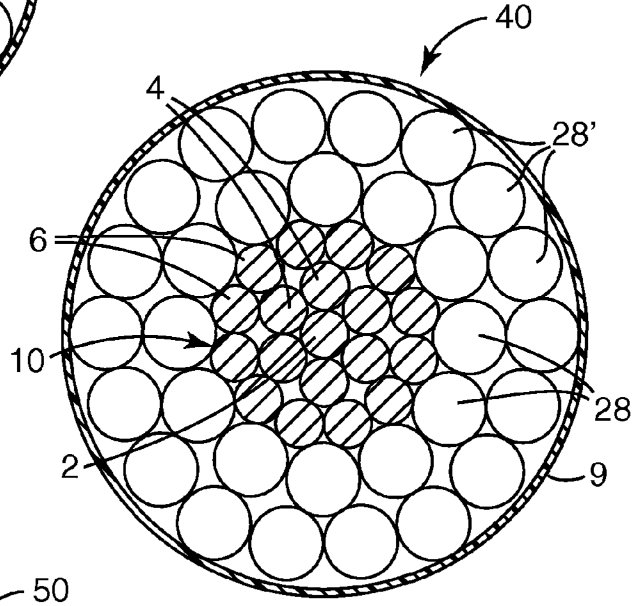
Figure 2C:
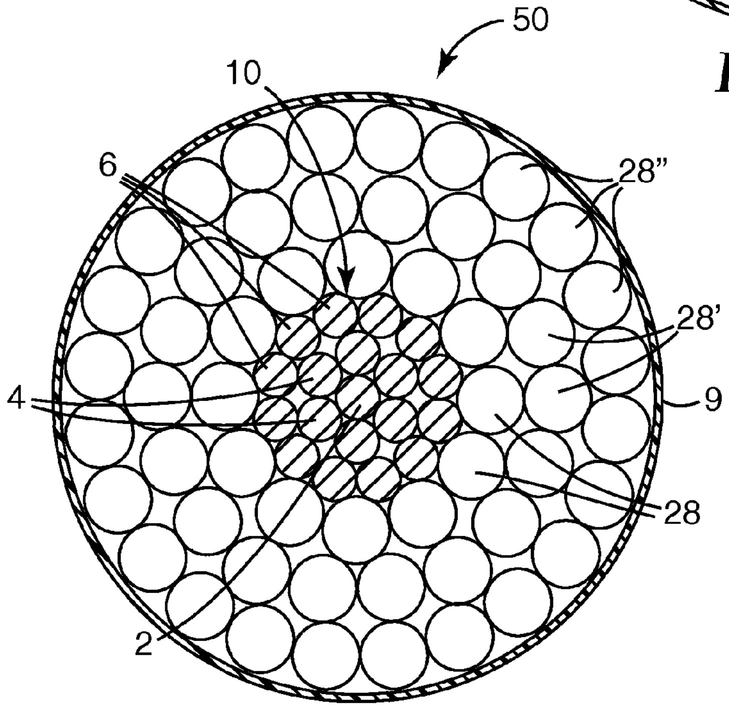
Figure 2D:
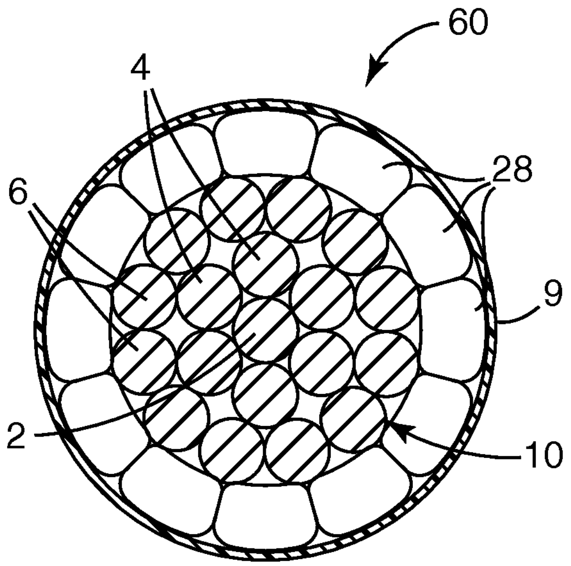
Figure 2E:
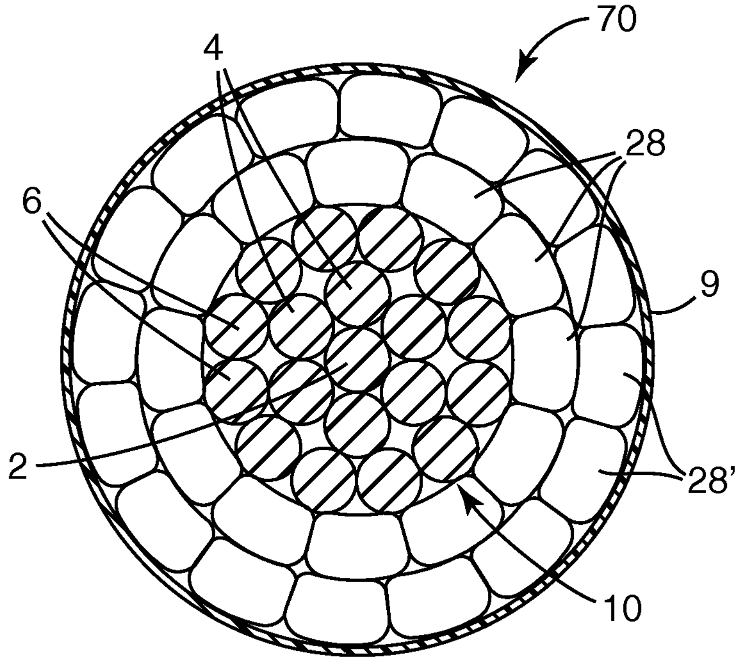

In the particular embodiments illustrated by FIGS. 2A-2C, the respective insulated stranded composite cables (e.g., 30, 40, 50) have a non-insulated composite core 10 corresponding to the stranded but non-insulated composite cable 10 of FIG. 1A, which includes a single wire 2 defining a center longitudinal axis, a first layer comprising a first plurality of composite wires 4 stranded around the single composite wire 2 in a first lay direction, a second layer comprising a second plurality of composite wires 6 stranded around the first plurality of composite wires 4 in the first lay direction. In certain exemplary embodiments, the first plurality of ductile wires 28 is stranded in a lay direction opposite to that of an adjoining radial layer, for example, the second layer comprising the second plurality of composite wires 6.

In other exemplary embodiments, the first plurality of ductile wires 28 is stranded in a lay direction the same as that of an adjoining radial layer, for example, the second layer comprising the second plurality of composite wires 6. In further exemplary embodiments, at least one of the first plurality of ductile wires 28, the second plurality of ductile wires 28', or the third plurality of ductile wires 28", is stranded in a lay direction opposite to that of an adjoining radial layer, for example, the second layer comprising the second plurality of composite wires 6.

In further exemplary embodiments, each ductile wire (28, 28', or 28") has a cross-sectional shape, in a direction substantially normal to the center longitudinal axis, selected from circular, elliptical, oval, rectangular, or trapezoidal. FIGS. 2A-2C illustrate embodiments wherein each ductile wire (28, 28') has a cross-sectional shape, in a direction substantially normal to the center longitudinal axis, that is substantially circular. In the particular embodiment illustrated by FIG. 2D, the stranded composite cable 60 comprises a first plurality of generally trapezoidal-shaped ductile wires 28 stranded around the stranded composite cable core 10 corresponding to FIG. 1A. In a further embodiment illustrated by FIG. 2E, the stranded composite cable 10''' further comprises a second plurality of generally trapezoidal-shaped ductile wires 28' stranded around the non-insulated stranded composite cable 10 corresponding to FIG. 1A. In further exemplary embodiments, some or all of the ductile wires (28, 28') may have a cross-sectional shape, in a direction substantially normal to the center longitudinal axis, that is "Z" or "S" shaped (not shown). Wires of such shapes are known in the art, and may be desirable, for example, to form an interlocking outer layer of the cable.

In additional embodiments, the ductile wires (28, 28') comprise at least one metal selected from the group consisting of copper, aluminum, iron, zinc, cobalt, nickel, chromium, titanium, tungsten, vanadium, zirconium, manganese, silicon, alloys thereof, and combinations thereof.

Although FIGS. 3A-3E show a single center composite core wire 2 defining a center longitudinal axis, it is additionally understood that single center composite core wire 2 may alternatively be a ductile metal wire 1, as previously illustrated in FIGS. 1B and 1D. It is further understood that each layer of composite wires exhibits a lay length, and that the lay length of each layer of composite wires may be different, or preferably, the same lay length.

Furthermore, it is understood that in some exemplary embodiments, each of the composite wires has a cross-sectional shape, in a direction substantially normal to the center longitudinal axis, generally circular, elliptical, or trapezoidal. In certain exemplary embodiments, each of the composite wires has a cross-sectional shape that is generally circular, and the diameter of each composite wire is at least about 0.1 mm, more preferably at least 0.5 mm; yet more preferably at least 1 mm, still more preferably at least 2 mm, most preferably at least 3 mm; and at most about 15 mm, more preferably at most 10 mm, still more preferably at most 5 mm, even more preferably at most 4 mm, most preferably at most 3 mm. In other exemplary embodiments, the diameter of each composite wire may be less than 1 mm, or greater than 5 mm.

Typically the average diameter of the single center wire, having a generally circular cross-sectional shape, is in a range from about 0.1 mm to about 15 mm. In some embodiments, the average diameter of the single center wire is desirably is at least about 0.1 mm, at least 0.5 mm, at least 1 mm, at least 2 mm, at least 3 mm, at least 4 mm, or even up to about 5 mm. In other embodiments, the average diameter of the single central wire is less than about 0.5 mm, less than 1 mm, less than 3 mm, less than 5 mm, less than 10 mm, or less than 15 mm.

In additional exemplary embodiments not illustrated by FIGS. 2A-2E, the stranded composite cable may include more than three stranded layers of composite wires about the single wire defining a center longitudinal axis. In certain exemplary embodiments, each of the composite wires in each layer of the composite cable may be of the same construction and shape; however this is not required in order to achieve the benefits described herein.

In a further aspect, the present disclosure provides various embodiments of a stranded electrical power transmission cable comprising a composite core and a conductor layer around the composite core, and in which the composite core comprises any of the above-described stranded composite cables. In some embodiments, the electrical power transmission cable may be useful as an overhead electrical power transmission cable, an underground electrical power transmission cable, an undersea electrical power transmission cable, or a component thereof. Exemplary undersea electrical power transmission cables and applications are described in co-pending U.S. Prov. Pat. App. No. 61/226,056, titled "SUBMERSIBLE COMPOSITE CABLE AND METHODS," filed Jul. 16, 2009.

In certain exemplary embodiments, the conductor layer comprises a metal layer which surrounds and in some embodiments contacts substantially an entire surface of the composite cable core. In other exemplary embodiments, the conductor layer comprises a plurality of ductile metal conductor wires stranded about the composite cable core.

For stranded composite cables comprising a plurality of composite wires (e.g., 2, 4, 6) and optionally, ductile metal wires (e.g., 28, 28', 28"), it is desirable, in some embodiments, to hold the composite wires (e.g., at least the second plurality of composite wires 6 in the second layer of FIG. 1A-1D or 2A-2E) together during or after stranding using a maintaining means, for example, a tape overwrap, with or without adhesive, or a binder (see, e.g., U.S. Pat. No. 6,559,385 B1 (Johnson et al.)). FIGS. 3A-3D and 4 illustrate various embodiments using a maintaining means in the form of a tape 18 to hold the composite wires together after stranding. In certain embodiments, tape 18 may act as an electrically insulating sheath 32 surrounding the stranded composite wires.

Figure 3A:
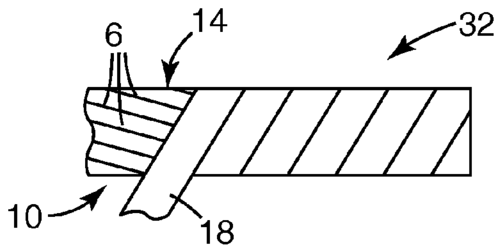
FIG. 3A is a side view of an exemplary stranded composite cable including maintaining means around a stranded composite wire core, useful in preparing exemplary embodiments of insulated stranded composite power cables of the present disclosure.
Figure 3B:
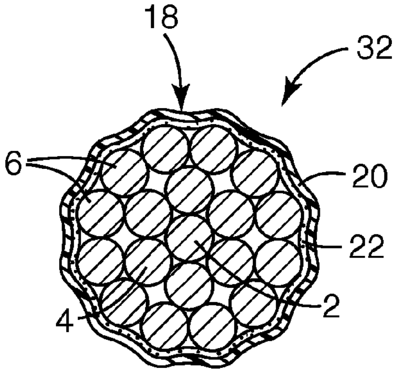
FIGS. 3B-3D are cross-sectional end views of exemplary stranded composite cables including various maintaining means around a stranded composite wire core, useful in preparing exemplary embodiments of insulated stranded composite power cables of the present disclosure.
Figure 3C:
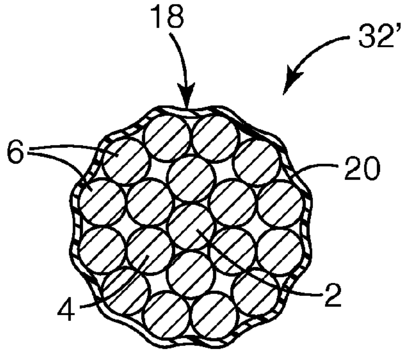

FIG. 3A is a side view of an exemplary stranded composite cable 10 (FIG. 1A), with an exemplary maintaining means comprising a tape 18 partially applied to the stranded composite cable 10 around the composite wires (2, 4, 6). As shown in FIG. 3B, tape 18 may comprise a backing 20 with an adhesive layer 22. Alternatively, as shown in FIG. 3C, the tape 18 may comprise only a backing 20, without an adhesive. In certain embodiments, tape 18 may act as an electrically insulating sheath 32 surrounding the stranded composite wires.

In certain exemplary embodiments, tape 18 may be wrapped such that each successive wrap abuts the previous wrap without a gap and without overlap, as is illustrated in FIG. 3A. Alternatively, in some embodiments, successive wraps may be spaced so as to leave a gap between each wrap or so as to overlap the previous wrap. In one preferred embodiment, the tape 18 is wrapped such that each wrap overlaps the preceding wrap by approximately ⅓ to ½ of the tape width.

FIG. 3B is a cross-sectional end view of the stranded tape-wrapped composite cable 32 of FIG. 3A in which the maintaining means is a tape 18 comprises a backing 20 with an adhesive 22. In this exemplary embodiment, suitable adhesives include, for example, (meth)acrylate (co)polymer based adhesives, poly(α-olefin) adhesives, block copolymer based adhesives, natural rubber based adhesives, silicone based adhesives, and hot melt adhesives. Pressure sensitive adhesives may be preferred in certain embodiments. In some exemplary embodiments, the tape 18 may act as an insulative sheath surrounding the composite cable.

In further exemplary embodiments, suitable materials for tape 18 or backing 20 include metal foils, particularly aluminum; polyester; polyimide; fluoropolymer films (including those comprising fully and partially fluorinated (co)polymers), glass reinforced backings; and combinations thereof; provided the tape 18 is strong enough to maintain the elastic bend deformation and is capable of retaining its wrapped configuration by itself, or is sufficiently restrained if necessary. One particularly preferred backing 20 is aluminum. Such a backing preferably has a thickness of between 0.002 and 0.005 inches (0.05 to 0.13 mm), and a width selected based on the diameter of the stranded composite cable 10. For example, for a stranded composite cable 10 having two layers of stranded composite wires such as illustrated in FIG. 3A, and having a diameter of about 0.5 inches (1.3 cm), an aluminum tape having a width of 1.0 inch (2.5 cm) is preferred.

Some presently preferred commercially available tapes include the following Metal Foil Tapes (available from 3M Company, St. Paul, Minn.): Tape 438, a 0.005 inch thick (0.13 mm) aluminum backing with acrylic adhesive and a total tape thickness of 0.0072 inches (0.18 mm); Tape 431, a 0.0019 inch thick (0.05 mm) aluminum backing with acrylic adhesive and a total tape thickness of 0.0031 inches (0.08 mm); and Tape 433, a 0.002 inch thick (0.05 mm) aluminum backing with silicone adhesive and a total tape thickness of 0.0036 inches (0.09 mm) A suitable metal foil/glass cloth tape is Tape 363 (available from 3M Company, St. Paul, Minn.), as described in the Examples. A suitable polyester backed tape includes Polyester Tape 8402 (available from 3M Company, St. Paul, Minn.), with a 0.001 inch thick (0.03 mm) polyester backing, a silicone based adhesive, and a total tape thickness of 0.0018 inches (0.03 mm).

FIG. 3C is a cross-sectional end view of another embodiment of a stranded tape-wrapped composite cable 32' according to FIG. 3A in which tape 18 comprises a backing 20 without adhesive. When tape 18 is a backing 20 without adhesive, suitable materials for backing 20 include any of those just described for use with an adhesive, with a preferred backing being an aluminum backing having a thickness of between 0.002 and 0.005 inches (0.05 to 0.13 mm) and a width of 1.0 inch (2.54 cm). In certain embodiments, tape 18 may act as an electrically insulating sheath surrounding the stranded composite wires, as described above with respect to element 3 of FIGS. 1F-1G.

When using tape 18 as the maintaining means, either with or without adhesive 22, the tape may be applied to the stranded cable with conventional tape wrapping apparatus as is known in the art. Suitable taping machines include those available from Watson Machine, International, Patterson, N.J., such as model number CT-300 Concentric Taping Head. The tape overwrap station is generally located at the exit of the cable stranding apparatus and is applied to the helically stranded composite wires prior to the cable 10 being wound onto a take up spool. The tape 18 is selected so as to maintain the stranded arrangement of the elastically deformed composite wires.

Figure 3D:
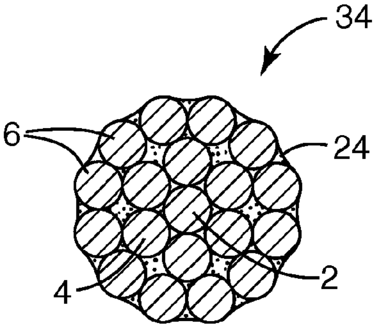
Figure 4:
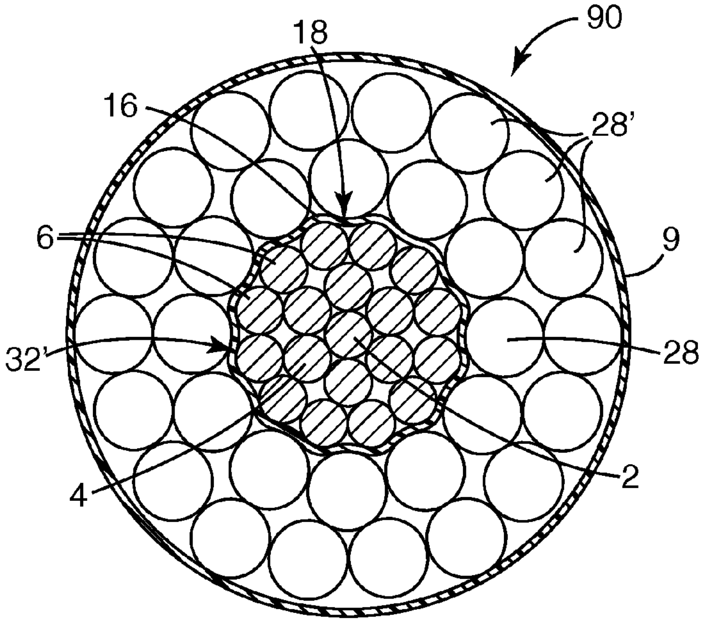
FIG. 4 is a cross-sectional end view of an exemplary insulated stranded composite cable including a maintaining means around a stranded composite wire core, and one or more layers comprising a plurality of ductile metal conductors stranded around the stranded composite wire core, useful in preparing exemplary embodiments of insulated stranded composite power cables of the present disclosure.

FIG. 3D illustrates another alternative exemplary embodiment of a stranded encapsulated composite cable 34 with a maintaining means in the form of a binder 24 applied to the non-insulated stranded composite cable 10 as shown in FIG. 1A to maintain the composite wires (2, 4, 6) in their stranded arrangement. In certain embodiments, binder 24 may act as an electrically insulating sheath 3 surrounding the stranded composite wires, as described above with respect to FIGS. 1F-1G. In certain embodiments, binder 24 may act as an electrically insulating sheath surrounding the stranded composite wires, as described above with respect to element 3 of FIGS. 1F-1G.

Suitable binders 24 (which in some exemplary embodiments may be used as insulative fillers 3 as shown in FIGS. 1F-1G) include pressure sensitive adhesive compositions comprising one or more poly (alpha-olefin) homopolymers, copolymers, terpolymers, and tetrapolymers derived from monomers containing 6 to 20 carbon atoms and photoactive crosslinking agents as described in U.S. Pat. No. 5,112,882 (Babu et al.). Radiation curing of these materials provides adhesive films having an advantageous balance of peel and shear adhesive properties.

Alternatively, the binder 24 may comprise thermoset materials, including but not limited to epoxies. For some binders, it is preferable to extrude or otherwise coat the binder 24 onto the non-insulated stranded composite cable 10 while the wires are exiting the cabling machine as discussed above. Alternatively, the binder 24 can be applied in the form of an adhesive supplied as a transfer tape. In this case, the binder 24 is applied to a transfer or release sheet (not shown). The release sheet is wrapped around the composite wires of the stranded composite cable 10. The backing is then removed, leaving the adhesive layer behind as the binder 24.

In further embodiments, an adhesive 22 or binder 24 may optionally be applied around each individual composite wire, or between any suitable layer of composite and ductile metal wires as is desired. Thus, in the particular embodiment illustrated by FIG. 4, the stranded composite cable 90 comprises a first plurality of ductile wires 28 stranded around a tape-wrapped composite core 32' illustrated by FIG. 3C, and a second plurality of ductile wires 28' stranded around the first plurality of ductile wires 28. Tape 18 is wrapped around the non-insulated stranded composite core 10 illustrated by FIG. 1A, which includes a single composite wire 2 defining a center longitudinal axis, a first layer comprising a first plurality of composite wires 4 which may be stranded around the single composite wire 2 in a first lay direction, and a second layer comprising a second plurality of composite wires 6 which may be stranded around the first plurality of composite wires 4 in the first lay direction. Tape 18 forms an electrically insulating sheath 32' surrounding the stranded composite wires (e.g., 2, 4, 6). A second insulative sheath 9 surrounds both the plurality of composite wires (e.g., 2, 4 and 6) and the plurality of ductile wires (e.g., 28 and 28").

In one presently preferred embodiment, the maintaining means does not significantly add to the total diameter of the stranded composite cable 10. Preferably, the outer diameter of the stranded composite cable including the maintaining means is no more than 110% of the outer diameter of the plurality of stranded composite wires (2, 4, 6, 8) excluding the maintaining means, more preferably no more than 105%, and most preferably no more than 102%.

It will be recognized that the composite wires have a significant amount of elastic bend deformation when they are stranded on conventional cabling equipment. This significant elastic bend deformation would cause the wires to return to their un-stranded or unbent shape if there were not a maintaining means for maintaining the helical arrangement of the wires. Therefore, in some embodiments, the maintaining means is selected so as to maintain significant elastic bend deformation of the plurality of stranded composite wires Furthermore, the intended application for the stranded composite cable may suggest certain maintaining means are better suited for the application. For example, when the stranded composite cable is used as a submersible or underground electrical power transmission cable, either the binder 24 or the tape 18 without an adhesive 22 should be selected so as to not adversely affect the electrical power transmission at the temperatures, depths, and other conditions experienced in this application. When an adhesive tape 18 is used as the maintaining means, both the adhesive 22 and the backing 20 should be selected to be suitable for the intended application.

Figure 5:
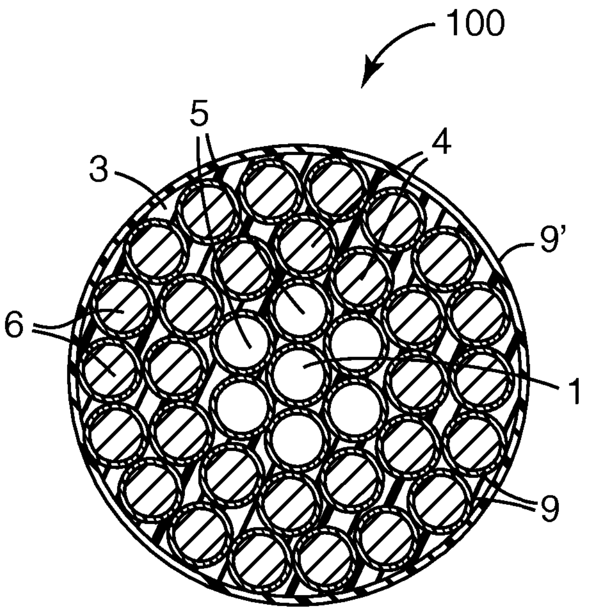
FIG. 5 is a cross-sectional end view of an exemplary insulated stranded composite cable including one or more layers comprising a plurality of individually insulated composite wires stranded about a core comprising a plurality of individually insulated non-composite wires, according to another exemplary embodiment of the present disclosure.

In yet another alternative exemplary embodiment illustrated in FIG. 5, the insulated composite cable 100 includes one or more layers comprising a plurality of individually insulated composite wires stranded about a core comprising a plurality of individually insulated wires, and an optional additional sheath surrounding the entirety of the composite wires. Thus, as shown in FIG. 5, the insulated composite cable 100 includes a single core wire 1 (which may be, for example, a ductile metal wire, a metal matrix composite wire, a polymer matrix composite wire, an optical fiber wire, or a hollow tubular wire for fluid transport) defining a center longitudinal axis; at least a first layer comprising a first plurality of core wires 5 as previously described (which optionally may be stranded, more preferably helically stranded around the single core wire 1 in a first lay direction), a first layer comprising a first plurality of composite wires 4 (which optionally may be stranded, more preferably helically stranded around the single core wire 1 in a first lay direction); an optional second layer comprising a second plurality of composite wires 6 (which optionally may be stranded, more preferably helically stranded around the first plurality of composite wires 4 in the first lay direction); an insulative sheath 9' surrounding the entirety of the plurality of composite wires, and an additional insulative sheath 9 optionally surrounding each individual wire (1, 4, 5, 6, etc.).

Additionally, FIG. 5 illustrates use of an optional insulative filler 3 (which may be a binder 24 as described below with respect to FIG. 3D, or which may be an insulative material, such as a non-electrically conductive solid or liquid) as described above to substantially fill any voids left between the individual wires (1, 2, 4, and 6) and the insulative sheath 9' surrounding the entirety of the plurality of wires (1, 2, 4, 6, etc.).

In certain exemplary embodiments, the stranded composite wires each comprise a plurality of continuous fibers in a matrix as will be discussed in more detail later. Because the wires are composite, they do not generally accept plastic deformation during the cabling or stranding operation, which would be possible with ductile metal wires. For example, in prior art arrangements including ductile wires, the conventional cabling process could be carried out so as to permanently plastically deform the composite wires in their helical arrangement. The present disclosure allows use of composite wires which can provide superior desired characteristics compared to conventional ductile metal wires. The maintaining means allows the stranded composite cable to be conveniently handled when being incorporated into a subsequent final article, such as a submersible or underground composite cable.

In some exemplary embodiments, each of the composite wires is a fiber reinforced composite wire. In certain exemplary embodiments, at least one of the fiber reinforced composite wires is reinforced with one of a fiber tow or a monofilament fiber.

In additional exemplary embodiments, each of the composite wires is selected from the group consisting of a metal matrix composite wire and a polymer composite wire. In further exemplary embodiments, some of the composite wires are selected to be metal matrix composite wires, and some of the composite wires are selected to be polymer matrix composite wires. In other exemplary embodiments, all of the composite wires may be selected to be either metal matrix composite wires or polymer matrix composite wires.

In some exemplary embodiments, the polymer composite wire comprises at least one continuous fiber in a polymer matrix. In further exemplary embodiments, the at least one continuous fiber comprises metal, carbon, ceramic, glass, or combinations thereof. In particular exemplary embodiments, the at least one continuous fiber comprises titanium, tungsten, boron, shape memory alloy, carbon, carbon nanotubes, graphite, silicon carbide, aramid, poly(p-phenylene-2,6-benzobisoxazole, or combinations thereof. In additional exemplary embodiments, the polymer matrix comprises a (co) polymer selected from the group consisting of an epoxy, an ester, a vinyl ester, a polyimide, a polyester, a cyanate ester, a phenolic resin, a bis-maleimide resin, polyetheretherketone, and combinations thereof.

In other exemplary embodiments, the metal matrix composite wire comprises at least one continuous fiber in a metal matrix. In further exemplary embodiments, the at least one continuous fiber comprises a material selected from the group consisting of ceramics, glasses, carbon nanotubes, carbon, silicon carbide, boron, iron, steel, ferrous alloys, tungsten, titanium, shape memory alloy, and combinations thereof. In some exemplary embodiments, the metal matrix comprises aluminum, zinc, tin, magnesium, alloys thereof, or combinations thereof. In certain embodiments, the metal matrix comprises aluminum, and the at least one continuous fiber comprises a ceramic fiber. In certain presently preferred embodiments, the ceramic fiber comprises polycrystalline $\alpha$-$Al_2O_3$.

In certain embodiments in which the metal matrix composite wire is used to provide an armor and/or strength element, the fibers are preferably selected from poly(aramid) fibers, ceramic fibers, boron fibers, carbon fibers, metal fibers, glass fibers, and combinations thereof. In certain exemplary embodiments, the armor element comprises a plurality of wires surrounding a core composite cable in a cylindrical layer. Preferably, the wires are selected from metal armor wires, metal matrix composite wires, polymer matrix composite wires, and combinations thereof.

In certain exemplary embodiments illustrated by FIGS. 6A-6C, the stranded composite cable and/or electrically conductive non-composite cable comprising the core (11, 11', 11") comprises at least one, and preferably a plurality of ductile metal wires. In additional exemplary embodiments, each of the plurality of metal wires, when viewed in a radial cross section, has a cross-sectional shape selected from the group consisting of circular, elliptical, trapezoidal, S-shaped, and Z-shaped. In some particular exemplary embodiments, the plurality of metal wires comprise at least one metal selected from the group consisting of iron, steel, zirconium, copper, tin, cadmium, aluminum, manganese, zinc, cobalt, nickel, chromium, titanium, tungsten, vanadium, their alloys with each other, their alloys with other metals, their alloys with silicon, and combinations thereof.

In some particular additional exemplary embodiments, at least one of the composite cables is a stranded composite cable comprising a plurality of cylindrical layers of the composite wires stranded about a center longitudinal axis of the at least one composite cable when viewed in a radial cross section. In certain exemplary embodiments, the at least one stranded composite cable is helically stranded. In certain presently preferred embodiments, each cylindrical layer is stranded at a lay angle in a lay direction that is the same as a lay direction for each adjoining cylindrical layer. In certain presently preferred embodiments, a relative difference between lay angles for each adjoining cylindrical layer is greater than 0° and no greater than 3°.

In further exemplary embodiments, the composite wires have a cross-sectional shape selected from the group consisting of circular, elliptical, and trapezoidal. In some exemplary embodiments, each of the composite wires is a fiber reinforced composite wire. In certain exemplary embodiments, at least one of the fiber reinforced composite wires is reinforced with one of a fiber tow or a monofilament fiber. In other exemplary embodiments, each of the composite wires is selected from the group consisting of a metal matrix composite wire and a polymer composite wire. In certain other exemplary embodiments, the polymer composite wire comprises at least one continuous fiber in a polymer matrix. In some exemplary embodiments, the at least one continuous fiber comprises metal, carbon, ceramic, glass, or combinations thereof.

In some exemplary embodiments, the at least one continuous fiber comprises titanium, tungsten, boron, shape memory alloy, carbon, carbon nanotubes, graphite, silicon carbide, poly(aramid), poly(p-phenylene-2,6-benzobisoxazole, or combinations thereof. In certain exemplary embodiments, the polymer matrix comprises a (co)polymer selected from the group consisting of an epoxy, an ester, a vinyl ester, a polyimide, a polyester, a cyanate ester, a phenolic resin, a bismaleimide resin, polyetheretherketone, a fluoropolymer (including fully and partially fluorinated (co)polymers), and combinations thereof.

In some exemplary embodiments, the composite wire comprises at least one continuous fiber in a metal matrix. In other exemplary embodiments, the composite wire comprises at least one continuous fiber in a polymer matrix. In certain exemplary embodiments, the at least one continuous fiber comprises a material selected from the group consisting of ceramics, glasses, carbon nanotubes, carbon, silicon carbide, boron, iron, steel, ferrous alloys, tungsten, titanium, shape memory alloy, and combinations thereof. In certain exemplary embodiments, the metal matrix comprises aluminum, zinc, tin, magnesium, alloys thereof, or combinations thereof. In certain presently preferred embodiments, the metal matrix comprises aluminum, and the at least one continuous fiber comprises a ceramic fiber. In some particular presently preferred embodiments, the ceramic fiber comprises polycrystalline $\alpha$-$Al_2O_3$.

In further exemplary embodiments, the insulative sheath forms an outer surface of the submersible or underground composite cable. In some exemplary embodiments, the insulative sheath comprises a material selected from the group consisting of a ceramic, a glass, a (co)polymer, and combinations thereof.

In some exemplary embodiments, the sheath may have desirable characteristics. For example, in some embodiments, the sheath may be insulative (i.e. electrically insulative and/or thermally or acoustically insulative). In certain exemplary embodiments, the sheath provides a protective capability to the underlying a core cable, and optional plurality of electrically conductive non-composite cables. The protective capability may be, for example, improved puncture resistance, improved corrosion resistance, improved resistance to extremes of high or low temperature, improved friction resistance, and the like.

Preferably, the sheath comprises a thermoplastic polymeric material, more preferably a thermoplastic polymeric material selected from high density polyolefins (e.g. high density polyethylene), medium density polyolefins (e.g. medium density polyethylene), and/or thermoplastic fluoropolymers. Suitable fluoropolymers include fluorinated ethylenepropylene copolymer (FEP), polytetrafluoroethylene (PTFE), ethylenetetrafluorethylene (ETFE), ethylenechlorotrifluoroethylene (ECTFE), polyvinylidene fluoride (PVDF), polyvinyl fluoride (PVF), tetrafluoroethylene polymer (TFV). Particularly suitable fluoropolymers are those sold under the trade names DYNEON THY FLUOROPLASTICS, DYNEON ETFE FLUOROPLASTICS, DYNEON FEP FLUOROPLASTICS, DYNEON PFA FLUOROPLASTICS, and DYNEON PVDF FLUOROPLASTICS (all available from 3M Company, St. Paul, Minn.).

In some exemplary embodiments, the sheath may further comprise an armor element which preferably also functions as a strength element. In other presently preferred exemplary embodiments, the armor and/or strength element comprises a plurality of wires surrounding the core cable and arranged in a cylindrical layer. Preferably, the wires are selected from metal (e.g. steel) wires, metal matrix composite wires, polymer matrix composite wires, and combinations thereof.

In some exemplary embodiments, the insulated composite power cable may further comprise an armor or reinforcing layer. In certain exemplary embodiments, the armor layer comprises one or more cylindrical layers surrounding at least the composite core. In some exemplary embodiments, the armor or reinforcing layer may take the form of a tape or fabric layer formed radially within the insulated composite power cable, and preferably comprising a plurality of fibers that surrounds or is wrapped around at least the composite core and thus the plurality of composite wires. Preferably, the fibers are selected from poly(aramid) fibers, ceramic fibers, boron fibers, carbon fibers, metal fibers, glass fibers, and combinations thereof.

In certain embodiments, the armor or reinforcing layer and/or sheath may also act as an insulative element for an electrically conductive composite or non-composite cable. In such embodiments, the armor or reinforcing layer and/or sheath preferably comprises an insulative material, more preferably an insulative polymeric material as described above.

While the present disclosure may be practiced with any suitable composite wire, in certain exemplary embodiments, each of the composite wires is selected to be a fiber reinforced composite wire comprising at least one of a continuous fiber tow or a continuous monofilament fiber in a matrix.

A preferred embodiment for the composite wires comprises a plurality of continuous fibers in a matrix. A preferred fiber comprises polycrystalline $\alpha$-$Al_2O_3$. These preferred embodiments for the composite wires preferably have a tensile strain to failure of at least 0.4%, more preferably at least 0.7%. In some embodiments, at least 85% (in some embodiments, at least 90%, or even at least 95%) by number of the fibers in the metal matrix composite core are continuous.

Other composite wires that could be used with the present disclosure include glass/epoxy wires; silicon carbide/aluminum composite wires; carbon/aluminum composite wires;

carbon/epoxy composite wires; carbon/polyetheretherketone (PEEK) wires; carbon/(co)polymer wires; and combinations of such composite wires.

Examples of suitable glass fibers include A-Glass, B-Glass, C-Glass, D-Glass, S-Glass, AR-Glass, R-Glass, fiberglass and paraglass, as known in the art. Other glass fibers may also be used; this list is not limited, and there are many different types of glass fibers commercially available, for example, from Corning Glass Company (Corning, N.Y.).

In some exemplary embodiments, continuous glass fibers may be preferred. Typically, the continuous glass fibers have an average fiber diameter in a range from about 3 micrometers to about 19 micrometers. In some embodiments, the glass fibers have an average tensile strength of at least 3 GPa, 4 GPa, and or even at least 5 GPa. In some embodiments, the glass fibers have a modulus in a range from about 60 GPa to 95 GPa, or about 60 GPa to about 90 GPa.

Examples of suitable ceramic fibers include metal oxide (e.g., alumina) fibers, boron nitride fibers, silicon carbide fibers, and combination of any of these fibers. Typically, the ceramic oxide fibers are crystalline ceramics and/or a mixture of crystalline ceramic and glass (i.e., a fiber may contain both crystalline ceramic and glass phases). Typically, such fibers have a length on the order of at least 50 meters, and may even have lengths on the order of kilometers or more. Typically, the continuous ceramic fibers have an average fiber diameter in a range from about 5 micrometers to about 50 micrometers, about 5 micrometers to about 25 micrometers about 8 micrometers to about 25 micrometers, or even about 8 micrometers to about 20 micrometers. In some embodiments, the crystalline ceramic fibers have an average tensile strength of at least 1.4 GPa, at least 1.7 GPa, at least 2.1 GPa, and or even at least 2.8 GPa. In some embodiments, the crystalline ceramic fibers have a modulus greater than 70 GPa to approximately no greater than 1000 GPa, or even no greater than 420 GPa.

Examples of suitable monofilament ceramic fibers include silicon carbide fibers. Typically, the silicon carbide monofilament fibers are crystalline and/or a mixture of crystalline ceramic and glass (i.e., a fiber may contain both crystalline ceramic and glass phases). Typically, such fibers have a length on the order of at least 50 meters, and may even have lengths on the order of kilometers or more. Typically, the continuous silicon carbide monofilament fibers have an average fiber diameter in a range from about 100 micrometers to about 250 micrometers. In some embodiments, the crystalline ceramic fibers have an average tensile strength of at least 2.8 GPa, at least 3.5 GPa, at least 4.2 GPa and or even at least 6 GPa. In some embodiments, the crystalline ceramic fibers have a modulus greater than 250 GPa to approximately no greater than 500 GPa, or even no greater than 430 GPa.

Suitable alumina fibers are described, for example, in U.S. Pat. No. 4,954,462 (Wood et al.) and U.S. Pat. No. 5,185,299 (Wood et al.). In some embodiments, the alumina fibers are polycrystalline alpha alumina fibers and comprise, on a theoretical oxide basis, greater than 99 percent by weight $Al_2O_3$ and 0.2-0.5 percent by weight $SiO_2$, based on the total weight of the alumina fibers. In another aspect, some desirable polycrystalline, alpha alumina fibers comprise alpha alumina having an average grain size of less than one micrometer (or even, in some embodiments, less than 0.5 micrometer). In another aspect, in some embodiments, polycrystalline, alpha alumina fibers have an average tensile strength of at least 1.6 GPa (in some embodiments, at least 2.1 GPa, or even, at least 2.8 GPa). Exemplary alpha alumina fibers are marketed under the trade designation “NEXTEL 610” (3M Company, St. Paul, Minn.).

Suitable aluminosilicate fibers are described, for example, in U.S. Pat. No. 4,047,965 (Karst et al). Exemplary aluminosilicate fibers are marketed under the trade designations “NEXTEL 440”, “NEXTEL 550”, and “NEXTEL 720” by 3M Company of St. Paul, Minn. Aluminoborosilicate fibers are described, for example, in U.S. Pat. No. 3,795,524 (Sowman). Exemplary aluminoborosilicate fibers are marketed under the trade designation “NEXTEL 312” by 3M Company. Boron nitride fibers can be made, for example, as described in U.S. Pat. No. 3,429,722 (Economy) and U.S. Pat. No. 5,780,154 (Okano et al.). Exemplary silicon carbide fibers are marketed, for example, by COI Ceramics of San Diego, Calif. under the trade designation “NICALON” in tows of 500 fibers, from Ube Industries of Japan, under the trade designation “TYRANNO”, and from Dow Corning of Midland, Mich. under the trade designation “SYLRAMIC”.

Suitable carbon fibers include commercially available carbon fibers such as the fibers designated as PANEX® and PYRON® (available from ZOLTEK, Bridgeton, Mo.), THORNEL (available from CYTEC Industries, Inc., West Paterson, N.J.), HEXTOW (available from HEXCEL, Inc., Southbury, Conn.), and TORAYCA (available from TORAY Industries, Ltd. Tokyo, Japan). Such carbon fibers may be derived from a polyacrylonitrile (PAN) precursor. Other suitable carbon fibers include PAN-IM, PAN-HM, PAN UHM, PITCH or rayon byproducts, as known in the art.

Additional suitable commercially available fibers include ALTEX (available from Sumitomo Chemical Company, Osaka, Japan), and ALCEN (available from Nitivy Company, Ltd., Tokyo, Japan).

Suitable fibers also include shape memory alloy (i.e., a metal alloy that undergoes a Martensitic transformation such that the metal alloy is deformable by a twinning mechanism below the transformation temperature, wherein such deformation is reversible when the twin structure reverts to the original phase upon heating above the transformation temperature). Commercially available shape memory alloy fibers are available, for example, from Johnson Matthey Company (West Whiteland, Pa.).

In some embodiments the ceramic fibers are in tows. Tows are known in the fiber art and refer to a plurality of (individual) fibers (typically at least 100 fibers, more typically at least 400 fibers) collected in a roving-like form. In some embodiments, tows comprise at least 780 individual fibers per tow, in some cases at least 2600 individual fibers per tow, and in other cases at least 5200 individual fibers per tow. Tows of ceramic fibers are generally available in a variety of lengths, including 300 meters, 500 meters, 750 meters, 1000 meters, 1500 meters, 2500 meters, 5000 meters, 7500 meters, and longer. The fibers may have a cross-sectional shape that is circular or elliptical.

Commercially available fibers may typically include an organic sizing material added to the fiber during manufacture to provide lubricity and to protect the fiber strands during handling. The sizing may be removed, for example, by dissolving or burning the sizing away from the fibers. Typically, it is desirable to remove the sizing before forming metal matrix composite wire. The fibers may also have coatings used, for example, to enhance the wettability of the fibers, to reduce or prevent reaction between the fibers and molten metal matrix material. Such coatings and techniques for providing such coatings are known in the fiber and composite art.

In further exemplary embodiments, each of the composite wires is selected from a metal matrix composite wire and a polymer composite wire. Suitable composite wires are disclosed, for example, in U.S. Pat. Nos. 6,180,232; 6,245,425;

6,329,056; 6,336,495; 6,344,270; 6,447,927; 6,460,597; 6,544,645; 6,559,385, 6,723,451; and 7,093,416.

One presently preferred fiber reinforced metal matrix composite wire is a ceramic fiber reinforced aluminum matrix composite wire. The ceramic fiber reinforced aluminum matrix composite wires preferably comprise continuous fibers of polycrystalline α-$Al_2O_3$ encapsulated within a matrix of either substantially pure elemental aluminum or an alloy of pure aluminum with up to about 2% by weight copper, based on the total weight of the matrix. The preferred fibers comprise equiaxed grains of less than about 100 nm in size, and a fiber diameter in the range of about 1-50 micrometers. A fiber diameter in the range of about 5-25 micrometers is preferred with a range of about 5-15 micrometers being most preferred.

Preferred fiber reinforced composite wires to the present disclosure have a fiber density of between about 3.90-3.95 grams per cubic centimeter. Among the preferred fibers are those described in U.S. Pat. No. 4,954,462 (Wood et al., assigned to Minnesota Mining and Manufacturing Company, St. Paul, Minn.). Preferred fibers are available commercially under the trade designation "NEXTEL 610" alpha alumina based fibers (available from 3M Company, St. Paul, Minn.). The encapsulating matrix is selected to be such that it does not significantly react chemically with the fiber material (i.e., is relatively chemically inert with respect the fiber material, thereby eliminating the need to provide a protective coating on the fiber exterior.

In certain presently preferred embodiments of a composite wire, the use of a matrix comprising either substantially pure elemental aluminum, or an alloy of elemental aluminum with up to about 2% by weight copper, based on the total weight of the matrix, has been shown to produce successful wires. As used herein the terms "substantially pure elemental aluminum", "pure aluminum" and "elemental aluminum" are interchangeable and are intended to mean aluminum containing less than about 0.05% by weight impurities.

In one presently preferred embodiment, the composite wires comprise between about 30-70% by volume polycrystalline α-$Al_2O_3$ fibers, based on the total volume of the composite wire, within a substantially elemental aluminum matrix. It is presently preferred that the matrix contains less than about 0.03% by weight iron, and most preferably less than about 0.01% by weight iron, based on the total weight of the matrix. A fiber content of between about 40-60% polycrystalline α-$Al_2O_3$ fibers is preferred. Such composite wires, formed with a matrix having a yield strength of less than about 20 MPa and fibers having a longitudinal tensile strength of at least about 2.8 GPa have been found to have excellent strength characteristics.

The matrix may also be formed from an alloy of elemental aluminum with up to about 2% by weight copper, based on the total weight of the matrix. As in the embodiment in which a substantially pure elemental aluminum matrix is used, composite wires having an aluminum/copper alloy matrix preferably comprise between about 30-70% by volume polycrystalline α-$Al_2O_3$ fibers, and more preferably therefore about 40-60% by volume polycrystalline α-$Al_2O_3$ fibers, based on the total volume of the composite. In addition, the matrix preferably contains less than about 0.03% by weight iron, and most preferably less than about 0.01% by weight iron based on the total weight of the matrix. The aluminum/copper matrix preferably has a yield strength of less than about 90 MPa, and, as above, the polycrystalline α-$Al_2O_3$ fibers have a longitudinal tensile strength of at least about 2.8 GPa.

Composite wires preferably are formed from substantially continuous polycrystalline α-$Al_2O_3$ fibers contained within the substantially pure elemental aluminum matrix or the matrix formed from the alloy of elemental aluminum and up to about 2% by weight copper described above. Such wires are made generally by a process in which a spool of substantially continuous polycrystalline α-$Al_2O_3$ fibers, arranged in a fiber tow, is pulled through a bath of molten matrix material. The resulting segment is then solidified, thereby providing fibers encapsulated within the matrix.

Exemplary metal matrix materials include aluminum (e.g., high purity, (e.g., greater than 99.95%) elemental aluminum, zinc, tin, magnesium, and alloys thereof (e.g., an alloy of aluminum and copper). Typically, the matrix material is selected such that the matrix material does not significantly chemically react with the fiber (i.e., is relatively chemically inert with respect to fiber material), for example, to eliminate the need to provide a protective coating on the fiber exterior. In some embodiments, the matrix material desirably includes aluminum and alloys thereof.

In some embodiments, the metal matrix comprises at least 98 percent by weight aluminum, at least 99 percent by weight aluminum, greater than 99.9 percent by weight aluminum, or even greater than 99.95 percent by weight aluminum. Exemplary aluminum alloys of aluminum and copper comprise at least 98 percent by weight Al and up to 2 percent by weight Cu. In some embodiments, useful alloys are 1000, 2000, 3000, 4000, 5000, 6000, 7000 and/or 8000 series aluminum alloys (Aluminum Association designations). Although higher purity metals tend to be desirable for making higher tensile strength wires, less pure forms of metals are also useful.

Suitable metals are commercially available. For example, aluminum is available under the trade designation "SUPER PURE ALUMINUM; 99.99% Al" from Alcoa of Pittsburgh, Pa. Aluminum alloys (e.g., Al-2% by weight Cu (0.03% by weight impurities)) can be obtained, for example, from Belmont Metals, New York, N.Y. Zinc and tin are available, for example, from Metal Services, St. Paul, Minn. ("pure zinc"; 99.999% purity and "pure tin"; 99.95% purity). For example, magnesium is available under the trade designation "PURE" from Magnesium Elektron, Manchester, England. Magnesium alloys (e.g., WE43A, EZ33A, AZ81A, and ZE41A) can be obtained, for example, from TIMET, Denver, Colo.

The metal matrix composite wires typically comprise at least 15 percent by volume (in some embodiments, at least 20, 25, 30, 35, 40, 45, or even 50 percent by volume) of the fibers, based on the total combined volume of the fibers and matrix material. More typically the composite cores and wires comprise in the range from 40 to 75 (in some embodiments, 45 to 70) percent by volume of the fibers, based on the total combined volume of the fibers and matrix material.

Metal matrix composite wires can be made using techniques known in the art. Continuous metal matrix composite wire can be made, for example, by continuous metal matrix infiltration processes. One suitable process is described, for example, in U.S. Pat. No. 6,485,796 (Carpenter et al.). Wires comprising polymers and fiber may be made by pultrusion processes which are known in the art.

In additional exemplary embodiments, the composite wires are selected to include polymer composite wires. The polymer composite wires comprise at least one continuous fiber in a polymer matrix. In some exemplary embodiments, the at least one continuous fiber comprises metal, carbon, ceramic, glass, and combinations thereof. In certain presently preferred embodiments, the at least one continuous fiber comprises titanium, tungsten, boron, shape memory alloy, carbon nanotubes, graphite, silicon carbide, boron, poly(aramid), poly(p-phenylene-2,6-benzobisoxazole)3, and combinations thereof. In additional presently preferred embodiments, the polymer matrix comprises a (co)polymer selected from an epoxy, an ester, a vinyl ester, a polyimide, a polyester, a cyanate ester, a phenolic resin, a bis-maleimide resin, polyetheretherketone, a fluoropolymer (including fully and partially fluorinated (co)polymers), and combinations thereof.

Ductile metal wires for stranding around a composite core to provide a composite cable, e.g., an electrical power transmission cable according to certain embodiments of the present disclosure, are known in the art. Preferred ductile metals include iron, steel, zirconium, copper, tin, cadmium, aluminum, manganese, and zinc; their alloys with other metals and/or silicon; and the like. Copper wires are commercially available, for example from Southwire Company, Carrolton, Ga. Aluminum wires are commercially available, for example from Nexans, Weyburn, Canada or Southwire Company, Carrolton, Ga. under the trade designations "1350-H19 ALUMINUM" and "1350-H0 ALUMINUM".

Typically, copper wires have a thermal expansion coefficient in a range from about 12 ppm/° C. to about 18 ppm/° C. over at least a temperature range from about 20° C. to about 800° C. Copper alloy (e.g., copper bronzes such as Cu—Si—X, Cu—Al—X, Cu—Sn—X, Cu—Cd; where X=Fe, Mn, Zn, Sn and or Si; commercially available, for example from Southwire Company, Carrolton, Ga.; oxide dispersion strengthened copper available, for example, from OMG Americas Corporation, Research Triangle Park, N.C., under the designation "GLIDCOP") wires. In some embodiments, copper alloy wires have a thermal expansion coefficient in a range from about 10 ppm/° C. to about 25 ppm/° C. over at least a temperature range from about 20° C. to about 800° C. The wires may be in any of a variety shapes (e.g., circular, elliptical, and trapezoidal).

Typically, aluminum wire have a thermal expansion coefficient in a range from about 20 ppm/° C. to about 25 ppm/° C. over at least a temperature range from about 20° C. to about 500° C. In some embodiments, aluminum wires (e.g., "1350-H19 ALUMINUM") have a tensile breaking strength, at least 138 MPa (20 ksi), at least 158 MPa (23 ksi), at least 172 MPa (25 ksi) or at least 186 MPa (27 ksi) or at least 200 MPa (29 ksi). In some embodiments, aluminum wires (e.g., "1350-H0 ALUMINUM") have a tensile breaking strength greater than 41 MPa (6 ksi) to no greater than 97 MPa (14 ksi), or even no greater than 83 MPa (12 ksi).

Aluminum alloy wires are commercially available, for example, aluminum-zirconium alloy wires sold under the trade designations "ZTAL," "XTAL," and "KTAL" (available from Sumitomo Electric Industries, Osaka, Japan), or "6201" (available from Southwire Company, Carrolton, Ga.). In some embodiments, aluminum alloy wires have a thermal expansion coefficient in a range from about 20 ppm/° C. to about 25 ppm/° C. over at least a temperature range from about 20° C. to about 500° C.

The weight or area percentage of composite wires within the insulated composite cable will depend upon the design of the insulated composite cable and the conditions of its intended use. In some applications in which the insulated and preferably stranded composite cable is to be used as a component of an insulated composite cable (which may be an above ground, underground or submersible composite cable), it is preferred that the stranded cable be free of electrical power conductor layers around the plurality of composite cables. In certain presently preferred embodiments, the submersible or underground composite cable exhibits a strain to break limit of at least 0.5%.

The present disclosure is preferably carried out so as to provide very long submersible or underground composite cables. It is also preferable that the composite wires within the stranded composite cable 10 themselves are continuous throughout the length of the stranded cable. In one preferred embodiment, the composite wires are substantially continuous and at least 150 meters long. More preferably, the composite wires are continuous and at least 250 meters long, more preferably at least 500 meters, still more preferably at least 750 meters, and most preferably at least 1000 meters long in the stranded composite cable 10.

In another aspect, the present disclosure provides a method of making an insulated composite power cable, comprising (a) providing a wire core defining a common longitudinal axis, (b) arranging a plurality of composite wires around the wire core, and (c) surrounding the plurality of composite wires with an insulative sheath. In some exemplary embodiments, at least a portion of the plurality of composite wires is arranged around the single wire defining the common longitudinal axis in at least one cylindrical layer formed about the common longitudinal axis when viewed in a radial cross section. In certain exemplary embodiments, at least a portion of the plurality of composite wires is helically stranded around the wire core about the common longitudinal axis. In certain presently preferred embodiments, each cylindrical layer is stranded at a lay angle in a lay direction opposite to that of each adjoining cylindrical layer. In additional presently preferred embodiments, a relative difference between lay angles for each adjoining cylindrical layer is no greater than about 4°.

In an additional presently preferred aspect, the disclosure provides a method of making the stranded composite cables described above, the method comprising stranding a first plurality of composite wires about a single wire defining a center longitudinal axis, wherein stranding the first plurality of composite wires is carried out in a first lay direction at a first lay angle defined relative to the center longitudinal axis, and wherein the first plurality of composite wires has a first lay length; and stranding a second plurality of composite wires around the first plurality of composite wires, wherein stranding the second plurality of composite wires is carried out in the first lay direction at a second lay angle defined relative to the center longitudinal axis, and wherein the second plurality of composite wires has a second lay length, further wherein a relative difference between the first lay angle and the second lay angle is no greater than 4°. In one presently preferred embodiment, the method further comprises stranding a plurality of ductile wires around the composite wires.

The stranded composite cable, either including or not including ductile wires around the composite core, may then be covered with an insulative sheath. In additional exemplary embodiments, the insulative sheath forms an outer surface of the insulated composite power cable. In some exemplary embodiments, the insulative sheath comprises a material selected from a ceramic, a glass, a (co)polymer, and combinations thereof. The composite wires may be stranded or helically wound as is known in the art on any suitable cable stranding equipment, such as planetary cable stranders available from Cortinovis, Spa, of Bergamo, Italy, and from Watson Machinery International, of Patterson, N.J. In some embodiments, it may be advantageous to employ a rigid strander as is known in the art.

While any suitably-sized composite wire can be used, it is preferred for many embodiments and many applications that the composite wires have a diameter from 1 mm to 4 mm, however larger or smaller composite wires can be used.

In one preferred embodiment, the stranded composite cable includes a plurality of stranded composite wires that are helically stranded in a lay direction to have a lay factor of from 10 to 150. The "lay factor" of a stranded cable is determined by dividing the length of the stranded cable in which a single wire completes one helical revolution by the nominal outside of diameter of the layer that includes that strand.

During the cable stranding process, the center wire, or the intermediate unfinished stranded composite cable which will have one or more additional layers wound about it, is pulled through the center of the various carriages, with each carriage adding one layer to the stranded cable. The individual wires to be added as one layer are simultaneously pulled from their respective bobbins while being rotated about the center axis of the cable by the motor driven carriage. This is done in sequence for each desired layer. The result is a helically stranded core. Optionally, a maintaining means, such as a tape as described above, for example, can be applied to the resulting stranded composite core to aid in holding the stranded wires together.

In general, stranded composite cables according to the present disclosure can be made by stranding composite wires around a single wire in the same lay direction, as described above. The single wire may comprise a composite wire or a ductile wire. At least two layers of composite wires are formed by stranding composite wires about the single wire core, for example, 19 or 37 wires formed in at least two layers around a single center wire.

In some exemplary embodiments, stranded composite cables comprise stranded composite wires having a length of at least 100 meters, at least 200 meters, at least 300 meters, at least 400 meters, at least 500 meters, at least 1000 meters, at least 2000 meters, at least 3000 meters, or even at least 4500 meters or more.

The ability to handle the stranded cable is a desirable feature. Although not wanting to be bound by theory, the cable maintains its helically stranded arrangement because during manufacture, the metallic wires are subjected to stresses, including bending stresses, beyond the yield stress of the wire material but below the ultimate or failure stress. This stress is imparted as the wire is helically wound about the relatively small radius of the preceding layer or center wire. Additional stresses are imparted by closing dies which apply radial and shear forces to the cable during manufacture. The wires therefore plastically deform and maintain their helically stranded shape.

In some embodiments, techniques known in the art for straightening the cable may be desirable. For example, the finished cable can be passed through a straightener device comprised of rollers (each roller being for example, 10-15 cm (4-6 inches), linearly arranged in two banks, with, for example, 5-9 rollers in each bank. The distance between the two banks of rollers may be varied so that the rollers just impinge on the cable or cause severe flexing of the cable. The two banks of rollers are positioned on opposing sides of the cable, with the rollers in one bank matching up with the spaces created by the opposing rollers in the other bank. Thus, the two banks can be offset from each other. As the cable passes through the straightening device, the cable flexes back and forth over the rollers, allowing the strands in the conductor to stretch to the same length, thereby reducing or eliminating slack strands.

In some embodiments, it may be desirable to provide the single center wire at an elevated temperature (e.g., at least 25° C., 50° C., 75° C., 100° C., 125° C., 150° C., 200° C., 250° C., 300° C., 400° C., or even, in some embodiments, at least 500° C.) above ambient temperature (e.g., 22° C.). The single center wire can be brought to the desired temperature, for example, by heating spooled wire (e.g., in an oven for several hours). The heated spooled wire is placed on the pay-off spool of a stranding machine. Desirably, the spool at elevated temperature is in the stranding process while the wire is still at or near the desired temperature (typically within about 2 hours).

Further it may be desirable, for the composite wires on the payoff spools that form the outer layers of the cable, to be at the ambient temperature. That is, in some embodiments, it may be desirable to have a temperature differential between the single wire and the composite wires which form the outer composite layers during the stranding process. In some embodiments, it may be desirable to conduct the stranding with a single wire tension of at least 100 kg, 200 kg, 500 kg, 1000 kg., or even at least 5000 kg.

In a further aspect, the present disclosure provides a method of using an insulated composite power cable as described above, comprising burying at least a portion of the insulated composite power cable as described above under ground.

Reference throughout this specification to "one embodiment", "certain embodiments", "one or more embodiments" or "an embodiment", whether or not including the term "exemplary" preceding the term "embodiment", means that a particular feature, structure, material, or characteristic described in connection with the embodiment is included in at least one embodiment of the certain exemplary embodiments of the present disclosure. Thus, the appearances of the phrases such as "in one or more embodiments", "in certain embodiments", "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term 'about'.

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

The invention claimed is:

1. A composite power cable, comprising:

a first composite wire defining a common longitudinal axis;

a plurality of second composite wires helically stranded around the first composite wire about the common longitudinal axis;

an insulative sheath individually surrounding the first composite wire and an insulative sheath individually surrounding each of the second composite wires, wherein the insulative sheaths comprise a thermoplastic polymeric material; and a first plurality of aluminum or aluminum alloy wires helically stranded around and surrounding the plurality of second composite wires;

wherein the first composite wire and each of the second composite wires comprise a plurality of carbon fibers in a polymeric matrix; and wherein the insulative sheaths are distinct from the polymeric matrices of the first and second composite wires.

2. The composite power cable of claim 1, wherein at least a portion of the plurality of second composite wires is arranged around the first composite wire defining the common longitudinal axis in at least one cylindrical layer formed about the common longitudinal axis when viewed in a radial cross section.

3. The composite power cable of claim 1, wherein the plurality of second composite wires is arranged in at least two cylindrical layers defined about the common longitudinal axis when viewed in a radial cross section.

4. The composite power cable of claim 3, wherein each cylindrical layer is stranded at a lay angle in a lay direction that is the same as a lay direction for each adjoining cylindrical layer.

5. The composite power cable of claim 4, wherein a relative difference between lay angles for each adjoining cylindrical layer is greater than 0° and no greater than about 4°.

6. The composite power cable of claim 1, wherein the composite wires have a cross-sectional shape selected from the group consisting of circular, elliptical, and trapezoidal.

7. The composite power cable of claim 1, wherein the polymer matrix comprises a (co)polymer selected from the group consisting of an epoxy, an ester, a vinyl ester, a polyimide, a polyester, a cyanate ester, a phenolic resin, a bismaleimide resin, polyetheretherketone, and combinations thereof.

8. A method of making the composite power cable of claim 1, comprising:

providing a wire core defining a common longitudinal axis;

arranging a plurality of composite wires around the wire core; and surrounding the plurality of composite wires with a sheath.

9. The composite power cable of claim 1, wherein each of the plurality of second composite wires has a diameter of at least 1.0 mm and at most 5 mm.

10. The composite power cable of claim 1, wherein the first composite wire has a diameter of at least 1.0 mm and less than 5 mm.

11. The composite power cable of claim 1, wherein the plurality of second composite wires is stranded to have a lay factor of from 10 to 150.

12. The composite power cable of claim 1, wherein the first composite wire and each of the second composite wires has cross-sectional shape that is generally circular.

13. The composite power cable of claim 1, wherein the power cable comprises polyetheretherketone.

14. The composite power cable of claim 1, further comprising a first plurality of aluminum or aluminum alloy wires helically stranded around the plurality of second composite wires.

15. The composite power cable of claim 14, wherein the first plurality of aluminum or aluminum alloy wires is stranded in a lay direction opposite to that of the plurality of second composite wires.

16. The insulated composite power cable of claim 14, wherein the first plurality of aluminum or aluminum alloy wires have a cross-sectional shape that is generally circular or trapezoidal.

17. The composite power cable of claim 14, wherein the first plurality of aluminum or aluminum alloy wires comprises aluminum wires.

18. The composite power cable of claim 17, wherein the aluminum wires have a tensile breaking strength between 41 MPa and 83 MPa.

19. The composite power cable of claim 17, wherein the aluminum wires have a tensile breaking strength of at least 138 MPa.

20. The composite power cable of claim 14, wherein the first plurality of aluminum or aluminum alloy wires comprises aluminum alloy wires.

21. The composite power cable of claim 20, wherein the aluminum alloy wires comprise aluminum-zirconium alloy wires.

22. The composite power cable of claim 14, further comprising a second plurality of aluminum or aluminum alloy wires helically stranded around the first plurality of aluminum or aluminum alloy wires.

* * * * *

UNITED STATES PATENT AND TRADEMARK OFFICE

CERTIFICATE OF CORRECTION

PATENT NO. : 9,093,194 B2
APPLICATION NO. : 14/454050
DATED : July 28, 2015
INVENTOR(S) : Colin Mccullough et al.

It is certified that error appears in the above-identified patent and that said Letters Patent is hereby corrected as shown below:

In the specification

*Column 9, Line 23, delete “perfluoruinated” and insert -- perfluorinated --, therefor.

*Column 12, Line 45, delete “FIG.” and insert -- FIGS. --, therefor.

*Column 15, Line 9, delete “wires” and insert -- wires. --, therefor.

*Column 18, Line 15, delete ““ethylenetetrafluorethylene” and insert -- ethylenetetrafluoroethylene --, therefor.

*Column 18, Line 18, delete “(TFV).” and insert -- (TFE). --, therefor.

*Column 18, Line 19, delete “THY” and insert -- THV --, therefor.

*Column 19, Line 15, delete “and or” and insert -- or --, therefor.

*Column 19, Line 32, “and or” and insert -- or --, therefor.

*Column 19, Line 48, delete “and or” and insert -- or --, therefor.

*Column 23, Line 23, delete “X=Fe,” and insert -- X=Fe, --, therefor.

*Column 23, Line 24, delete “and or” and insert -- and/or --, therefor.

*Column 24, Line 58, “Cortinovis, Spa,” and insert -- Cortinovis Spa, --, therefor.

Signed and Sealed this
Twenty-third Day of February, 2016

Michelle K. Lee

Michelle K. Lee
*Director of the United States Patent and Trademark Office*

In the claims

*Column 28, Approx. Line 20, In Claim 16, after "The" delete "insulated".